United States Patent
Hudgins et al.

(10) Patent No.: US 11,531,374 B2
(45) Date of Patent: Dec. 20, 2022

(54) ATTACHABLE DISPLAY SCREEN FOR ELECTRONIC DEVICES

(71) Applicant: Stand Steady Company, LLC, Birmingham, AL (US)

(72) Inventors: Edward Tyler Hudgins, Birmingham, AL (US); Antoine Planche, Birmingham, AL (US); Scott Alexander Freeman, Birmingham, AL (US); William Marcus Vatis, Birmingham, AL (US)

(73) Assignee: Stand Steady Company, LLC, Birmingham, AL (US)

( * ) Notice: Subject to any disclaimer, the term of this patent is extended or adjusted under 35 U.S.C. 154(b) by 0 days.

(21) Appl. No.: 17/254,899

(22) PCT Filed: Feb. 27, 2020

(86) PCT No.: PCT/US2020/020079
§ 371 (c)(1),
(2) Date: Dec. 22, 2020

(87) PCT Pub. No.: WO2020/176719
PCT Pub. Date: Sep. 3, 2020

(65) Prior Publication Data
US 2021/0405702 A1  Dec. 30, 2021

Related U.S. Application Data

(63) Continuation-in-part of application No. 16/289,315, filed on Feb. 28, 2019, now Pat. No. 11,209,869.
(Continued)

(51) Int. Cl.
*G06F 1/16* (2006.01)

(52) U.S. Cl.
CPC ............ *G06F 1/1649* (2013.01); *G06F 1/166* (2013.01); *G06F 1/1622* (2013.01); *G06F 1/1624* (2013.01)

(58) Field of Classification Search
CPC ...... G06F 1/166; G06F 1/1622; G06F 1/1649; G06F 1/1624
See application file for complete search history.

(56) References Cited

U.S. PATENT DOCUMENTS

| 5,590,021 A | 12/1996 | Register |
| 5,768,096 A | 6/1998 | Williams et al. |
| (Continued) | | |

FOREIGN PATENT DOCUMENTS

| KR | 20100097882 | 9/2010 |
| WO | 03044378 | 5/2003 |
| WO | 2019212969 | 11/2019 |

OTHER PUBLICATIONS

"Slidenjoy—Le Slide", 2018, Retrieved from the Internet: <www.yourslide.co>.
(Continued)

*Primary Examiner* — Rockshana D Chowdhury
*Assistant Examiner* — Douglas R Burtner
(74) *Attorney, Agent, or Firm* — Bradley Arant Boult Cummings LLP

(57) ABSTRACT

The present disclosure provides an attachable external display screen for use on electronic devices. The display screen may be removably mounted onto a surface of an electronic device to provide the user with an additional display screen. The attachable display screen may utilize a dual sliding mechanism that allows for the display screen to slide out to different lengths relative to the screen of the electronic device. The attachable display screen may also utilize a torque hinge to pivotally couple the display screen to a frame that mounts onto the electronic device. The attachable
(Continued)

display screen is rotatable about both the horizontal and vertical axes, which allows a user to tilt and adjust the angle of the display screen.

14 Claims, 19 Drawing Sheets

Related U.S. Application Data

(60) Provisional application No. 62/957,888, filed on Jan. 7, 2020, provisional application No. 62/891,687, filed on Aug. 26, 2019.

(56) References Cited

U.S. PATENT DOCUMENTS

| | | |
|---|---|---|
| 6,222,507 B1 | 4/2001 | Gouko |
| 6,295,038 B1 | 9/2001 | Rebeske |
| 6,302,612 B1 | 10/2001 | Fowler et al. |
| 6,532,146 B1 | 3/2003 | Duquette |
| 6,643,124 B1 | 11/2003 | Wilk |
| 6,667,877 B2 | 12/2003 | Duquette |
| 6,667,878 B2 | 12/2003 | Ponx |
| 6,778,383 B2 | 8/2004 | Ho |
| 6,794,798 B2 | 9/2004 | Watanabe et al. |
| 6,859,219 B1 | 2/2005 | Sall |
| 6,967,632 B1* | 11/2005 | Minami ............... F16M 11/10 403/80 |
| 7,133,280 B2* | 11/2006 | Love ................... G06F 1/1681 361/679.07 |
| 7,136,282 B1 | 11/2006 | Rebeske |
| 7,245,948 B2* | 7/2007 | Jung ................... H04M 1/0212 455/90.3 |
| 7,283,353 B1* | 10/2007 | Jordan ................. H04N 5/64 345/1.3 |
| 7,295,429 B2* | 11/2007 | Jackson, Jr. .......... G06F 1/1656 361/679.27 |
| 7,375,954 B2* | 5/2008 | Yang ................... G06F 1/1622 248/920 |
| 7,440,003 B2* | 10/2008 | Shimamura .......... H04M 1/0212 348/14.02 |
| 7,460,364 B2 | 12/2008 | Yang |
| 7,499,737 B2* | 3/2009 | Mizuta ................ H04M 1/0212 16/334 |
| 7,505,254 B2* | 3/2009 | Sheng ................. G06F 1/18 361/679.07 |
| 7,542,270 B2* | 6/2009 | Chen ................... G06F 1/1611 248/221.11 |
| 7,633,744 B2 | 12/2009 | Kuhn |
| 7,660,914 B2 | 2/2010 | Perez et al. |
| D615,082 S | 5/2010 | Taichi |
| 7,752,789 B2 | 7/2010 | Sun et al. |
| 7,813,118 B2 | 10/2010 | Burge |
| 7,830,333 B2 | 11/2010 | Aoki |
| 7,848,091 B2 | 12/2010 | Han et al. |
| D630,204 S | 1/2011 | Kovac |
| D630,205 S | 1/2011 | Kovac |
| D630,206 S | 1/2011 | Kovac |
| D630,628 S* | 1/2011 | Kovac ........................ D14/327 |
| D634,745 S | 3/2011 | Park et al. |
| 7,936,558 B2 | 5/2011 | Chang |
| 7,952,866 B2 | 5/2011 | Lee et al. |
| 7,986,517 B2 | 7/2011 | Jiang et al. |
| 7,990,338 B2 | 8/2011 | Teng et al. |
| 7,991,442 B2 | 8/2011 | Kim |
| 8,018,715 B2 | 9/2011 | Chang |
| 8,064,193 B2 | 11/2011 | Thabit |
| D652,832 S | 1/2012 | Wu et al. |
| 8,098,231 B2 | 1/2012 | Jacobs et al. |
| 8,243,471 B2 | 8/2012 | Liang |
| 8,314,751 B2 | 11/2012 | Yang |
| 8,317,146 B2 | 11/2012 | Jung et al. |
| 8,405,571 B2 | 3/2013 | Chung |
| 8,529,111 B2 | 9/2013 | Chang |
| 8,560,003 B2 | 10/2013 | Kwak et al. |
| 8,681,486 B2 | 3/2014 | Singhal |
| 8,773,378 B2 | 7/2014 | Sirpal et al. |
| D715,301 S | 10/2014 | Ashcraft et al. |
| 8,963,840 B2 | 2/2015 | Sirpal et al. |
| D727,895 S | 4/2015 | Aoki et al. |
| 9,047,038 B2 | 6/2015 | Sirpal et al. |
| 9,092,190 B2 | 7/2015 | Sirpal et al. |
| 9,104,365 B2 | 8/2015 | Sirpal et al. |
| 9,304,553 B2 | 4/2016 | Park et al. |
| D761,800 S | 7/2016 | Muller |
| 9,441,782 B2* | 9/2016 | Funk ..................... F16M 13/00 |
| 9,477,394 B2 | 10/2016 | Sirpal et al. |
| 9,568,952 B2 | 2/2017 | Matzke et al. |
| 9,594,397 B2* | 3/2017 | Kiyamura ............... G06F 1/16 |
| 9,696,760 B1 | 7/2017 | Zhang |
| 9,707,722 B2 | 7/2017 | Nukada et al. |
| 9,727,295 B2 | 8/2017 | Holung et al. |
| 9,766,661 B2* | 9/2017 | Hui ....................... G06F 1/1654 |
| 9,766,850 B2 | 9/2017 | Eisenberg |
| 9,811,302 B2 | 11/2017 | Jouin |
| D808,950 S | 1/2018 | Miele et al. |
| 10,001,806 B2 | 6/2018 | Cheng et al. |
| 10,078,483 B2 | 9/2018 | Finnan |
| 10,082,832 B1* | 9/2018 | Wang .................... G06F 1/1681 |
| 10,400,942 B2* | 9/2019 | Ren ...................... F16M 11/10 |
| 10,550,995 B1 | 2/2020 | Hung et al. |
| D883,990 S | 5/2020 | Yao et al. |
| 10,809,762 B1* | 10/2020 | Levine ................. G06F 1/1607 |
| 10,817,020 B1* | 10/2020 | DeMaio ............... G06F 3/1423 |
| 10,835,106 B1* | 11/2020 | Ubbesen ............... F16M 11/10 |
| 11,163,335 B1* | 11/2021 | Tzeng .................. G06F 1/1616 |
| 2003/0043087 A1* | 3/2003 | Kim ..................... G06F 1/1641 345/1.1 |
| 2003/0095373 A1* | 5/2003 | Duquette ............. G06F 1/1683 361/679.04 |
| 2003/0218577 A1 | 11/2003 | Wang |
| 2003/0218860 A1* | 11/2003 | Shiraiwa .............. G06F 1/1622 361/679.04 |
| 2004/0051679 A1 | 3/2004 | Ponx |
| 2005/0162821 A1 | 7/2005 | Homer et al. |
| 2005/0237699 A1 | 10/2005 | Carroll |
| 2005/0253775 A1* | 11/2005 | Stewart ................ G06F 1/1616 345/1.1 |
| 2005/0270730 A1 | 12/2005 | Klushin et al. |
| 2006/0044747 A1* | 3/2006 | Chen ..................... G06F 1/1616 361/679.55 |
| 2006/0082518 A1 | 4/2006 | Ram |
| 2006/0197861 A1* | 9/2006 | Won .................... H04M 1/0218 348/333.06 |
| 2006/0268500 A1* | 11/2006 | Kuhn ................... G06F 1/1649 361/679.04 |
| 2007/0012856 A1* | 1/2007 | Chan .................... G06F 1/166 248/677 |
| 2007/0080950 A1 | 4/2007 | Lee et al. |
| 2007/0086154 A1 | 4/2007 | Koch |
| 2007/0127196 A1 | 6/2007 | King |
| 2008/0179895 A1 | 7/2008 | Lin |
| 2008/0198096 A1* | 8/2008 | Jung ..................... G09G 3/20 345/1.3 |
| 2008/0204985 A1* | 8/2008 | Bae ..................... H04M 1/0212 361/679.06 |
| 2008/0252555 A1 | 10/2008 | Jeon |
| 2009/0089841 A1* | 4/2009 | Hanlon ................ B60R 11/0235 725/75 |
| 2009/0100732 A1* | 4/2009 | Seidler ................. A47F 7/147 40/729 |
| 2009/0102744 A1 | 4/2009 | Ram |
| 2009/0146911 A1 | 6/2009 | Kang |
| 2009/0213035 A1* | 8/2009 | Edwards .............. G06F 1/1681 345/1.3 |
| 2009/0273539 A1 | 11/2009 | Pruett |
| 2010/0024271 A1* | 2/2010 | Seidler ................ G11B 33/0483 40/711 |
| 2010/0039350 A1 | 2/2010 | Wakefield et al. |
| 2010/0053027 A1 | 3/2010 | Tonnison et al. |
| 2011/0063785 A1* | 3/2011 | Yamagiwa .......... H04M 1/0247 361/679.01 |

(56) References Cited

U.S. PATENT DOCUMENTS

| | | | |
|---|---|---|---|
| 2011/0216483 A1* | 9/2011 | Vesely | G06F 1/1624 |
| | | | 361/679.01 |
| 2011/0228463 A1* | 9/2011 | Matagne | G06F 1/1649 |
| | | | 361/679.04 |
| 2011/0247249 A1 | 10/2011 | Cao | |
| 2011/0298690 A1* | 12/2011 | Reilly | G06F 1/1649 |
| | | | 345/1.1 |
| 2012/0127646 A1 | 5/2012 | Moscovitch | |
| 2012/0186583 A1 | 7/2012 | Drapes et al. | |
| 2012/0223872 A1 | 9/2012 | Ram | |
| 2012/0293936 A1* | 11/2012 | Wu | G06F 1/1637 |
| | | | 361/679.01 |
| 2013/0107427 A1* | 5/2013 | Cheng | G06F 1/166 |
| | | | 361/679.01 |
| 2013/0277271 A1* | 10/2013 | Toulotte | A45C 11/00 |
| | | | 206/752 |
| 2015/0036273 A1* | 2/2015 | Hui | G06F 1/166 |
| | | | 361/679.08 |
| 2015/0085436 A1* | 3/2015 | Dong | G06F 1/166 |
| | | | 361/679.3 |
| 2015/0198979 A1* | 7/2015 | Lam | G06F 1/1622 |
| | | | 361/679.09 |
| 2015/0212546 A1 | 7/2015 | Ram | |
| 2015/0277490 A1* | 10/2015 | Jasinski | G06F 1/1618 |
| | | | 361/679.04 |
| 2015/0378393 A1 | 12/2015 | Erad et al. | |
| 2016/0011630 A1* | 1/2016 | Chen | G06F 1/1622 |
| | | | 361/679.55 |
| 2016/0124466 A1 | 5/2016 | Ram | |
| 2016/0154434 A1 | 6/2016 | Lakhani | |
| 2016/0241686 A1* | 8/2016 | Zhang | H04M 1/0272 |
| 2016/0262278 A1* | 9/2016 | Kiyamura | G06F 1/16 |
| 2016/0320797 A1 | 11/2016 | Ram | |
| 2017/0003712 A1 | 1/2017 | Funk et al. | |
| 2017/0023980 A1 | 1/2017 | Marseille | |
| 2017/0147038 A1 | 5/2017 | Cody | |
| 2017/0255232 A1 | 9/2017 | Ram | |
| 2018/0088630 A1 | 3/2018 | Ram | |
| 2018/0189012 A1* | 7/2018 | Fang | G06F 1/1649 |
| 2018/0275717 A1 | 9/2018 | Ram | |
| 2019/0332146 A1 | 10/2019 | Yao et al. | |
| 2021/0227062 A1* | 7/2021 | Koreeda | H04B 1/3877 |
| 2021/0333839 A1* | 10/2021 | Yao | G06F 1/1681 |

OTHER PUBLICATIONS

"DUO: The on-the-go dual screen laptop monitor", 2019, Retrieved from the Internet: <www.kickstarter.com/.projects/747287659/duo-the-on-the-go-dual-screen-laptop-monitor>.

"Packed Pixels Go and Packed Pixels 4K", 2019, Retrieved from the Internet: <www.packedpixels.com>.

Robyn, "Ten 1 Design Mountie + Review", Mac Sources; Article [online], Feb. 7, 2018, Retrieved from the Internet <URL; http://macsources.com/ten-1-design-mountie-review/>.

"Slidenjoy: Prototype Preview"; Sliden Joy; Video [online], Dec. 5, 2016; <URL: https://www.youtube.com/watch?v=hkbo5OeX94w&list=UUEwspWGCBCpYywFMCgGUuVA&Index=4>; entire video.

International Search Report and Written Opinion dated Jun. 10, 2020 of corresponding International Patent Application No. PCT/US20/20079.

"DUO: Kickstarter's Completely Portable Dual-Screen Laptop Accessory", <URL: http://www.youtube.com/watch?v=3ccSagT42m8>, (PRODUCTHYPE) Jun. 19, 2018 (Jun. 19, 2018), entire video.

* cited by examiner

ATTACHABLE DISPLAY SCREEN FOR ELECTRONIC DEVICES

CROSS-REFERENCE TO RELATED APPLICATIONS

This application claims priority to U.S. application Ser. No. 16/289,315, filed Feb. 28, 2019, the entirety of which is incorporated by reference herein. This application also claims the benefit of U.S. Provisional Application No. 62/891,687, filed Aug. 26, 2019, and U.S. Provisional Application No. 62/957,888, filed Jan. 7, 2020, the entirety of which are incorporated by reference herein.

FIELD OF THE DISCLOSURE

The present disclosure relates generally to attachable display accessories for portable electronic devices. More particularly, the disclosure relates to a slidable, rotatable, and adjustable display screens that attach to an electronic device.

BACKGROUND

Conventional portable electronic devices, such as laptop computers, are generally provided with a single display screen. Users need to switch among windows on the screen when viewing different graphics or processing different files of data at the same time. This causes inconvenience to the user and does not satisfy user requirements. While attachable display accessories, such as attachable display screens, have been developed, these accessories are bulky and are not easily transportable. In addition, the attachable display screens currently on the market are designed to fit a specific electronic device. If a user purchases a new electronic device of a different size, the attachable display screen must be replaced with one that fits the new device or the positioning of the attachable display screen must be adjusted. Moreover, the attachable display screens currently on the market are not adjustable or rotatable to a user's viewing preference.

Accordingly, there remains a need in the art for an attachable display screen that is compact, easily transportable, can be used on different sized electronic devices without having to adjust the positioning of the attachable display screen, and that is rotatable about both the horizontal and vertical axes.

SUMMARY

In some embodiments, the present disclosure is directed to an attachable display device including a frame including an upper track, a lower track, and a receiving space disposed therebetween, a display screen slidably attached to an upper slide rail and a lower slide rail, wherein the upper slide rail and the lower slide rail are operatively coupled to the upper track and the lower track, wherein the display screen comprises a pivot joint that slidably couples the display screen to each of the upper slide rail and the lower slide rail, the display screen rotatable about a vertical axis via the pivot joint, and wherein the display screen is operable to selectively transition between a closed position in which the display screen is positioned within the receiving space and an open position in which the upper slide rail and the lower slide rail are configured for slidable deployment along the upper track and the lower track to a first horizontal distance and the display screen is configured for slidable deployment along the upper slide rail and the lower slide rail to a second horizontal distance. In this aspect, the second horizontal distance is greater than the first horizontal distance.

In one embodiment, the attachable display device further includes a torque hinge operatively connected to the pivot joint. In another embodiment, the pivot joint is operatively connected to the display screen by a post that is embedded within the display screen. The display screen may further include an electrical connector mounted therein and accessible from outside the display screen. In still another embodiment, the upper track and the lower track each include an elongated guide slot. In yet another embodiment, the upper track and the lower track further include a puck slidably attached thereto at each elongated guide slot. In another embodiment, the attachable display device further includes a kickstand operably attached to the frame and configured to rotate to an open position.

In other embodiments, the present disclosure is also directed to an attachable display device including a mounting frame including an upper track and a lower track, the upper track and the lower track each having an elongated guide slot, a puck slidably attached to the upper track and the lower track at each elongated guide slot, and a receiving space disposed between the upper track and the lower track, a display screen slidably attached to an upper slide rail and a lower slide rail, wherein the upper slide rail and the lower slide rail are operatively connected to the upper track and the lower track by the pucks, the display screen including a pivot joint that couples the display screen to each of the upper slide rail and the lower slide rail and is slidably attached to the upper slide rail and the lower slide rail, and a torque hinge operatively connected to the pivot joint, wherein the display screen is rotatable about a vertical axis via the pivot joint and the torque hinge, wherein the display screen is operable to selectively transition between a closed position in which the display screen is positioned within the receiving space and an open position in which the display screen extends outwardly of the mounting frame to be exposed from one side of the mounting frame, and wherein, in the open position, the display screen is configured to be slidably deployed to varying horizontal distances. In one embodiment, in the open position, the upper slide rail and the lower slide rail are configured for slidable deployment to a first horizontal distance and the display screen is configured for slidable deployment along the upper slide rail and the lower slide rail to a second horizontal distance that is greater than the first horizontal distance.

According to another embodiment, the display screen is rotatable about the vertical axis to an angle of 180 degrees allowing the display screen to be deployed in a presentation position. In still another embodiment, the display screen is operatively connected to a control board configured to provide power and a display signal to the display screen. In yet another embodiment, the display screen further includes an electrical connector mounted therein and accessible from outside the display screen. The electrical connector may be a USB-C connector. In still another embodiment, the mounting frame includes at least one recess having a magnet embedded therein. In another embodiment, the upper slide rail and the lower slide rail include a stopping member at each end. In still another embodiment, the attachable display device further includes a kickstand operably attached to the mounting frame and configured to rotate to an open position.

In some embodiments, the present disclosure is further directed to an attachable display device including a mounting frame including an upper track and a lower track, the upper track and the lower track each having an elongated guide slot, a puck slidably attached to the upper track and the lower track at each elongated guide slot, a receiving space disposed between the upper track and the lower track, and at least one magnet attached to the mounting frame opposite the receiving space, a display screen slidably attached to an upper slide rail and a lower slide rail, wherein the upper slide rail and the lower slide rail are operatively connected to the mounting frame by the pucks, the display screen including a pivot joint that couples the display screen to each of the upper slide rail and the lower slide rail and is slidably attached to the upper slide rail and the lower slide rail, a torque hinge operatively connected to the pivot joint, and an electrical connector, wherein the display screen is operable to selectively transition between a closed position in which the display screen is positioned within the receiving space and an open position in which the display screen extends outwardly of the mounting frame to be exposed from one side of the mounting frame, and wherein the torque hinge and the pivot joint are configured so that the display screen rotates relative to the mounting frame to allow the display screen to be placed in an angled configuration.

In this aspect, the display screen may be operatively connected to a control board configured to provide power and a display signal to the display screen. In another embodiment, the display screen is a touch screen display. In still another embodiment, when the attachable display device is in the open position, the upper slide rail and the lower slide rail are configured for slidable deployment to a first horizontal distance and the display screen is configured for slidable deployment along the upper slide rail and the lower slide rail to a second horizontal distance that is greater than the first horizontal distance. In yet another embodiment, when the attachable display screen is in the open position, the display screen is rotatable about the mounting frame to an angle of 180 degrees allowing the display screen to be deployed in a presentation position. In still another embodiment, the attachable display device further includes a kickstand operably attached to the mounting frame and configured to rotate to an open position.

In other embodiments, the attachable display device includes a mounting frame including a front portion and a back portion, the back portion including at least one magnet attached thereto, and a torque hinge operatively attached to the front portion, wherein the torque hinge includes a central pivot point, a display screen operatively connected to the mounting frame via the torque hinge, wherein the display screen is operable to selectively transition between a closed position in which the display screen is positioned adjacent to the back portion and an open position in which the display screen extends outwardly of the mounting frame to be exposed from one side of the mounting frame, and wherein the torque hinge is configured so that the display screen vertically rotates relative to the mounting frame to allow the display screen to be placed in a tilted configuration. In one embodiment, the display screen is pivotally coupled to the central pivot point of the torque hinge. In another embodiment, the display screen is configured to vertically rotate 360 degrees about the central pivot point. In still another embodiment, the display screen is a touch screen display. In yet another embodiment, the display screen is operatively connected to a control board configured to provide power and a display signal to the display screen.

In some embodiments, the attachable display device includes a mounting frame including a front portion and a back portion, the back portion including at least one magnet attached thereto, and a torque hinge operatively attached to the front portion, wherein the torque hinge includes a central pivot point, a display screen pivotally coupled to the mounting frame via the central pivot point of the torque hinge, wherein the display screen is operable to swing between a closed position in which the display screen is positioned adjacent to the back portion and an open position in which the display screen extends outwardly of the mounting frame to be exposed from one side of the mounting frame, and wherein, in the open position, the torque hinge is configured so that the display screen vertically rotates relative to the mounting frame to allow the display screen to be placed in a tilted configuration and the display screen horizontally rotates relative to the mounting frame to allow the display screen to be placed in an angled configuration. In one embodiment, the back portion includes at least one recess having the at least one magnet embedded therein. In another embodiment, the at least one magnet is configured to slide in a horizontal direction within the at least one recess when the display screen transitions between the closed position and the open position. In still another embodiment, the display screen is configured to vertically rotate 360 degrees about the central pivot point. In yet another embodiment, the display screen is a LCD screen.

In other embodiments, the attachable display device includes a mounting frame including a front portion, the front portion including a moveable panel having a plurality of grooves, and a back portion, wherein the moveable panel includes a plurality of glides slidably attached to the plurality of grooves and the back portion includes at least one magnet attached thereto, and a torque hinge operatively attached to the moveable panel, wherein the torque hinge includes a central pivot point, a display screen pivotally coupled to the moveable panel via the central pivot point, wherein the display screen is operable to selectively transition between a closed position in which the display screen is positioned adjacent to the back portion and an open position in which the display screen extends outwardly of the mounting frame to be exposed from one side of the mounting frame, and wherein, in the open position, the plurality of glides are operable to slidably deploy the moveable panel such that the display screen is slidably deployed to varying horizontal distances. In one embodiment, the torque hinge is configured so that the display screen vertically rotates relative to the mounting frame to allow the display screen to be placed in a tilted configuration. In another embodiment, the display screen is configured to vertically rotate 360 degrees about the central pivot point. In still another embodiment, the display screen is operable to swing between the closed position and the open position. In yet another embodiment, the display screen is configured to vertically rotate 180 degrees about the central pivot point allowing the display screen to be deployed in a presentation position.

In some embodiments, the attachable display device includes a mounting frame including a front portion and a back portion, the back portion including at least one magnet attached thereto, and a torque hinge operatively attached to the front portion, wherein the torque hinge includes a central pivot point, a display screen operatively connected to the mounting frame via the central pivot point of the torque hinge, a kickstand operably attached to the mounting frame and configured to rotate to an open position, wherein the display screen is operable to selectively transition between a closed position in which the display screen is positioned adjacent to the back portion and an open position in which the display screen extends outwardly of the mounting frame to be exposed from one side of the mounting frame, and wherein the torque hinge is configured so that the display screen vertically rotates relative to the mounting frame to allow the display screen to be placed in a tilted configuration. In one embodiment, the kickstand is operably attached to the mounting frame via the torque hinge. In another embodiment, the kickstand has a cut-out U-shape and conforms to the contour of the mounting frame such that the kickstand is integral with the mounting frame when in a closed position. In still another embodiment, the display screen is configured to vertically rotate 360 degrees about the central pivot point. In another embodiment, the display screen is operatively connected to a control board configured to provide power and a display signal to the display screen.

In other embodiments, the attachable display device includes a mounting frame including a front portion and a back portion, the back portion including at least one magnet attached thereto, and a torque hinge operatively attached to the front portion, wherein the torque hinge includes a central pivot point, a display screen pivotally coupled to the mounting frame via the central pivot point of the torque hinge, a kickstand operably attached to the mounting frame via the torque hinge and configured to rotate to an open position, wherein the kickstand is integral with the mounting frame when the kickstand is in a closed position, wherein the display screen is operable to swing between a closed position in which the display screen is positioned adjacent to the back portion and an open position in which the display screen extends outwardly of the mounting frame to be exposed from one side of the mounting frame, and wherein, in the open position, the torque hinge is configured so that the display screen vertically rotates relative to the mounting frame to allow the display screen to be placed in a tilted configuration and the display screen horizontally rotates relative to the mounting frame to allow the display screen to be placed in an angled configuration. In one embodiment, the back portion includes at least one recess having the at least one magnet embedded therein. In another embodiment, the at least one magnet is configured to slide in a horizontal direction within the at least one recess when the display screen transitions between the closed position and the open position. In still another embodiment, the display screen is configured to vertically rotate 360 degrees about the central pivot point. In yet another embodiment, the kickstand is rotatable to an angle ranging from about 50 degrees to about 130 degrees. For example, the kickstand may be rotatable to an angle of about 90 degrees.

In still other embodiments, the attachable display device includes a mounting frame including a front portion including a moveable panel attached thereto, wherein the moveable panel has a plurality of grooves and a plurality of glides slidably attached to the plurality of grooves, a back portion including at least one magnet attached thereto, and a torque hinge operatively attached to the moveable panel, wherein the torque hinge includes a central pivot point, a display screen pivotally coupled to the moveable panel via the central pivot point, a kickstand operably attached to the mounting frame via the torque hinge and configured to rotate to an open position, wherein the kickstand conforms to a contour of the mounting frame when the kickstand is in a closed position, wherein the display screen is operable to selectively transition between a closed position in which the display screen is positioned adjacent to the back portion and an open position in which the display screen extends outwardly of the mounting frame to be exposed from one side of the mounting frame, and wherein, in the open position, the plurality of glides is operable to slidably deploy the moveable panel such that the display screen is slidably deployed to varying horizontal distances. In one embodiment, the torque hinge is configured so that the display screen vertically rotates relative to the mounting frame to allow the display screen to be placed in a tilted configuration. In another embodiment, the display screen is configured to vertically rotate 360 degrees about the central pivot point. In still another embodiment, the kickstand is rotatable to an angle ranging from about 50 degrees to about 130 degrees. In yet another embodiment, the display screen is configured to vertically rotate 180 degrees about the central pivot point allowing the display screen to be deployed in a presentation position.

BRIEF DESCRIPTION OF THE DRAWINGS

Further features and advantages can be ascertained from the following detailed description that is provided in connection with the drawings described below.

DETAILED DESCRIPTION

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Typical, exemplary degrees of error or variation are within 20 percent (%), preferably within 10%, and more preferably within 5% of a given value or range of values. Numerical quantities given in this description are approximate unless stated otherwise, meaning that the term "about" or "approximately" can be inferred when not expressly stated.

The terminology used herein is for the purpose of describing particular embodiments only and is not intended to be limiting. As used herein, the singular forms "a", "an" and "the" are intended to include the plural forms as well (i.e., at least one of whatever the article modifies), unless the context clearly indicates otherwise.

Spatially relative terms, such as "under," "below," "lower," "over," "upper," and the like, may be used herein for ease of description to describe one element or feature's relationship to another when the apparatus is right side up as shown in the accompanying drawings.

The present disclosure provides an attachable external display screen for use on electronic devices. More specifically, the display screen may be removably mounted onto a surface of an electronic device to provide the user with an additional display screen. The attachable display screen may be mounted onto any electronic device including, but not limited to, a laptop, tablet, tablet computer, desktop computer, smart phone, television, and gaming system. In one embodiment, the attachable display screen may be mounted onto a portable electronic device, such as a laptop or tablet. The attachable display screen provides users increased functionality and usability while still retaining the portability of the electronic device. The attachable display screen is also adjustable for different sized laptops without moving or adjusting the mounting mechanism.

Figure 1:
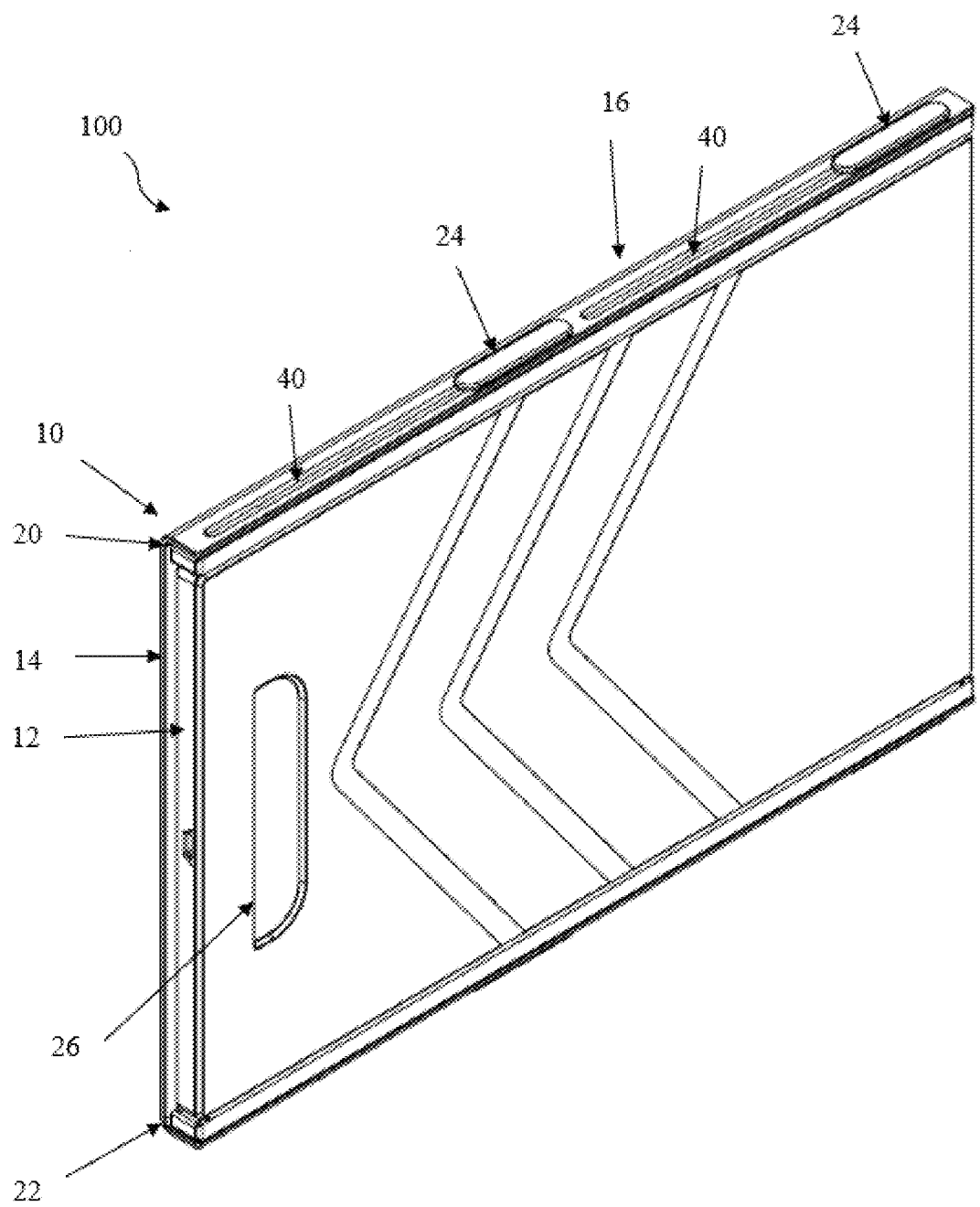
FIG. 1 is a front perspective view of an attachable display device according to an embodiment of the present disclosure.

FIG. 1 is a front perspective view of an attachable display device 100 according to an exemplary embodiment of the present disclosure. FIG. 1 shows the attachable display device 100 in a closed position prior to use. As shown in FIG. 1, the attachable display device 100 includes a mounting frame 10 for housing a display screen 12 therein. The display screen 12 may be any type of external electronic display including, but not limited to, an electroluminescent (ELD) display, liquid crystal display (LCD), light emitting diode (LED) display (e.g., organic light emitting diode (OLED) or microLED), plasma display panel (PDP), quantum dot (QLED) display, and a touch screen display.

It is contemplated that the mounting frame 10 and the display screen 12 be ergonomically sized so as to minimize the weight of the attachable display device 100 and reduce stress placed on the user's electronic device. In one embodiment, the total thickness of the attachable display device 100 (including the mounting frame 10 and the display screen 12) is about 12 mm to about 18 mm. In another embodiment, the total thickness of the attachable display device 100 (including the mounting frame 10 and the display screen 12) is about 14 mm to about 17 mm. In still another embodiment, the total thickness of the attachable display device 100 (including the mounting frame 10 and the display screen 12) is about 15 mm to about 16 mm. In yet another embodiment, the total thickness of the attachable display device 100 (including the mounting frame 10 and the display screen 12) is about 15.7 mm. In still another embodiment, the total thickness of the attachable display device 100 (including the mounting frame 10 and the display screen 12) is about 13 mm. As shown in FIG. 1, the back side of the display screen 12 may include an indentation 26 that can serve as a handle to aid the user in pulling the display screen 12 out from the mounting frame 10.

The mounting frame 10 is configured for attachment to a surface of a portable electronic device (not shown), such as to the back of a laptop screen. The mounting frame 10 may be formed of plastic, glass, ceramics, fiber composites, metal (e.g., stainless steel, aluminum, etc.), other suitable materials, or a combination of these materials. In one embodiment, the mounting frame 10 is formed of aluminum. While the mounting frame 10 has been illustrated herein as a single part, the mounting frame 10 may also be formed from multiple separate components, for example, a front plate and a back plate.

In the illustrated embodiment, the mounting frame 10 has a back portion 14 that removably attaches to the portable electronic device. The mounting frame 10 also includes an upper track 16 and a lower track (not shown) that operatively engage sliding rails (not shown) on the display screen 12. The upper track 16 and the lower track are spaced apart with one above the other in an essentially parallel relationship to each other. The upper track 16 is positioned at an upper edge 20 of the back portion 14, while the lower track is positioned at a lower edge 22 of the back portion 14.

In one embodiment, the upper track 16 and the lower track include one or more elongated guide slots 40. The guide slots 40 allow for the sliding rails of the display screen 12 to travel along the upper track 16 and the lower track and allow for increased lateral adjustment of the display screen 12. Each guide slot 40 operatively engages a puck 24. The pucks 24 are slidably attached to each of the upper track 16 and the lower track and hold the sliding rails of the display screen 12 in place. The pucks 24 may be attached to the upper track 16 and the lower track by any suitable means including, but not limited to, screws, pins, or projections. The pucks 24 limit the travel of the sliding rails on the display screen 12 to prevent detachment from the mounting frame 10. In the illustrated embodiment, the upper track 16 and the lower track each comprise two elongated guide slots 40 that operatively engage two pucks 24—a puck 24 at each guide slot 40. In another embodiment, the upper track 16 and the lower track may comprise a single elongated guide slot 40 that operatively engages a single puck 24. The pucks 24 may be formed from plastic, ceramics, fiber composites, metal, other suitable materials, or a combination of these materials. In one embodiment, the pucks 24 are formed from injection molded plastic to reduce wear and allow for smooth sliding.

Figure 2:
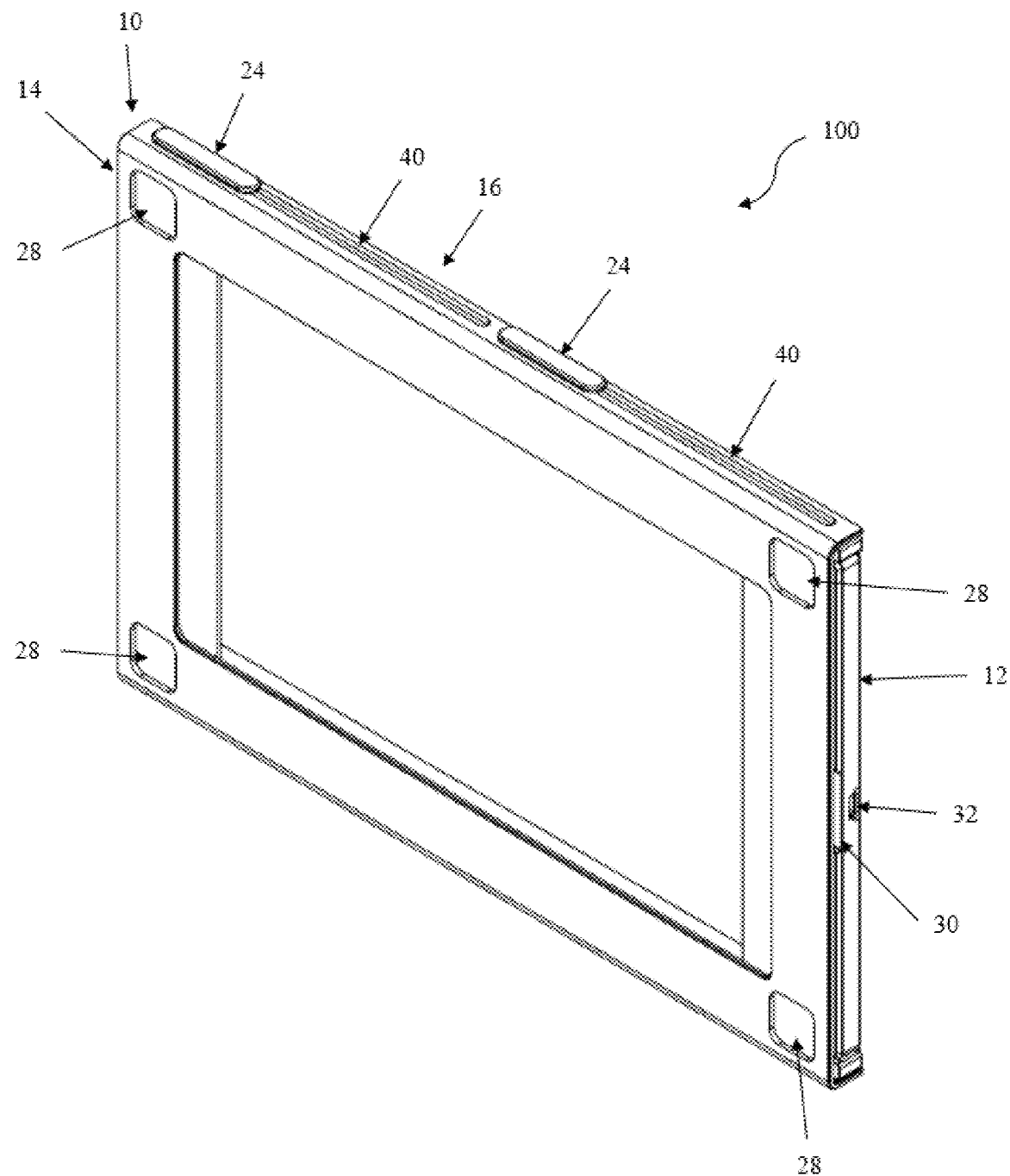
FIG. 2 is a rear perspective view of the attachable display device according to an embodiment of the present disclosure.

FIG. 2 is a rear perspective view of the attachable display device 100 according to an exemplary embodiment of the present disclosure. The mounting frame 10 with the display screen 12 housed therein can be removably mounted onto an electronic device (not shown). As can be seen in FIG. 2, the back portion 14 includes a plurality of recesses 28. Each recess 28 may house a magnet (not shown) therein.

Figure 3:
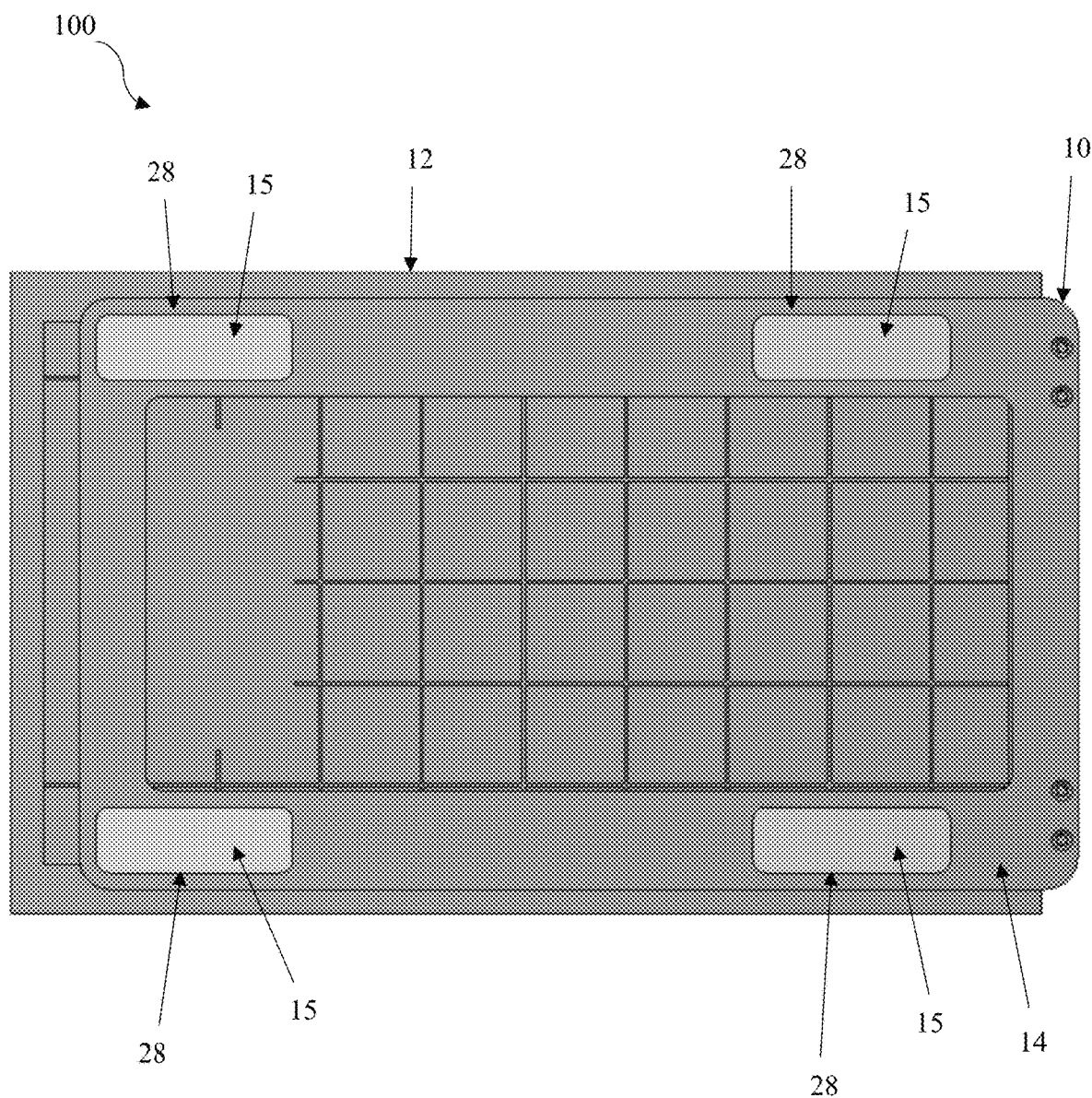
FIG. 3 is a rear perspective view of an attachable display device according to another embodiment of the present disclosure.

FIG. 3 is a rear perspective view of the attachable display device 100 showing magnets 15 embedded within the back portion 14 at each recess 28. The magnets 15 can serve as a means for attaching the attachable display device 100 to the portable electronic device. For instance, in one embodiment, the surface of the portable electronic device to which the attachable display device 100 is to be mounted may include a plurality of metal or steel stickers (not shown). The magnets 15 on the back portion 14 can attach to the plurality of metal or steel stickers by a magnetic force, which provides a secure connection onto the electronic device and prevents the attachable display device 100 from moving during use (but is still removable with sufficient force). By placing the magnets 15 on the back portion 14 (rather than on the electronic device), there is a reduced risk of the magnets 15 interfering with magnetic storage devices in the electronic device.

To assist with the opening and closing of the display screen 12, the magnets 15 on the back portion 14 may be slidable within each of the recesses 28. In this aspect, each of the recesses 28 may be sized such that each of the magnets 15 are configured to slide horizontally within the recesses 28. This allows for the mounting frame 10 to slide back and forth in the horizontal direction when the display screen 12 is opened and closed. The ability for the magnets 15 to slide within each of the recesses 28 also allows for the attachable display device 100 to be used on different sized electronic devices, such as different sized laptops, without having to adjust the positioning of the mounting frame 10. For example, the attachable display device 100 can be used on different laptops ranging in size from 13 inches to 17 inches without having to adjust the positioning of the mounting frame 10.

In another embodiment, the magnets 15 on the back portion 14 may be complementary in shape to each of the recesses 28 such that each of the magnets 15 fit securely within the recesses 28 and are not slidable. In this aspect, while the magnets 15 may not be slidable within the recesses 28, the magnets 15 may slide along the plurality of metal or steel stickers attached to the portable electronic device. That is, the mounting frame 10 having the magnets 15 embedded therein may slide back and forth on the plurality of metal or steel stickers when the display screen 12 is opened and closed.

Figure 4:
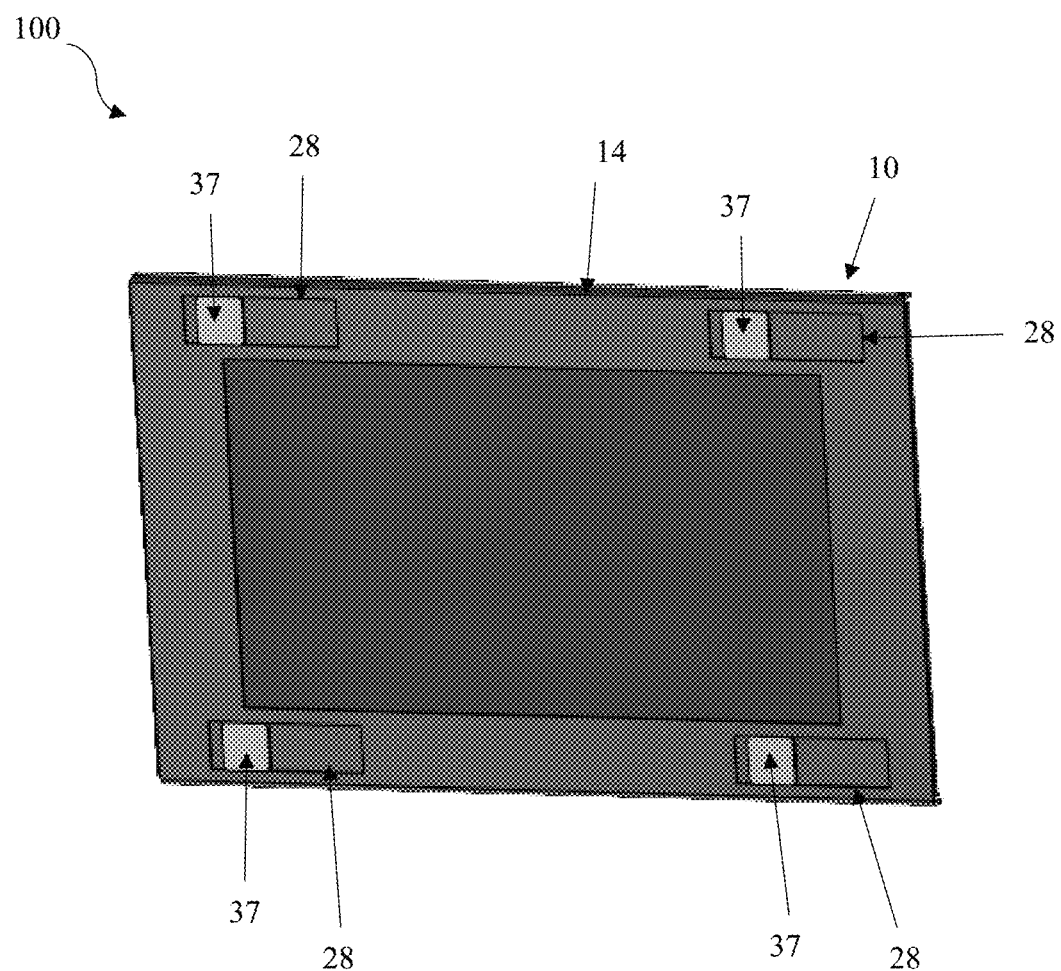
FIG. 4 is a rear perspective view of the attachable display device according to still another embodiment of the present disclosure.

FIG. 4 is a rear perspective view of the attachable display device 100 according to another embodiment of the present disclosure. In this embodiment, as shown in FIG. 4, a plurality of metal or steel stickers 37 may be attached to the mounting frame 10 (rather than the portable electronic device). The plurality of metal or steel stickers 37 may be attached to the mounting frame 10 at each recess 28. In this aspect, the plurality of metal or steel stickers 37 may securely connect to magnets 15 that are positioned on the surface of the portable electronic device to which the attachable display device 100 is to be mounted.

In the illustrated embodiments, the back portion 14 includes a recess 28 at each corner. However, the number and arrangement of the recesses 28 (and magnets embedded therein) on the back portion 14 may vary so long as the attachable display device 100 can be securely mounted onto the electronic device. While the use of magnets has been described herein as an exemplary means for attaching the attachable display device 100 to the electronic device, one of ordinary skill in the art will recognize that that the attachable display device 100 may be secured to the electronic device by any suitable means including, but not limited to, by hooks, adhesives, screws, pins, projections, or snap catch elements.

The display screen 12 may include a notch 30 to aid the user in pulling the display screen 12 out from the mounting frame 10, as shown in FIG. 2. The notch 30 may be any suitable shape so long as the notch 30 includes a finger-graspable surface and may be placed at any location on the display screen 12 that is accessible by the user. The display screen 12 also includes an electrical connector 32 for operably connecting the display screen 12 to the electronic device. In one embodiment, the display screen 12 may be operably connected to the electronic device through a direct electrical connection using a cord and a compatible plug for engagement with the electrical connector 32. For instance, the electrical connector 32 may be a USB connector, USB-A connector, USB-C connector, mini-USB connector, micro-USB connector, high definition multimedia interface (HDMI) connector, mini HDMI, DisplayPort, or mini DisplayPort. In one embodiment, the electrical connector 32 is a USB type-C connector for use with a USB type-C cord. In another embodiment, the display screen 12 may be operably connected to the electronic device through a wireless connection. For example, the display screen 12 may be operably connected to the electronic device using Wi-Fi, 802.11ac wireless, DLNA, Bluetooth, NFC, or the like.

Figure 5:
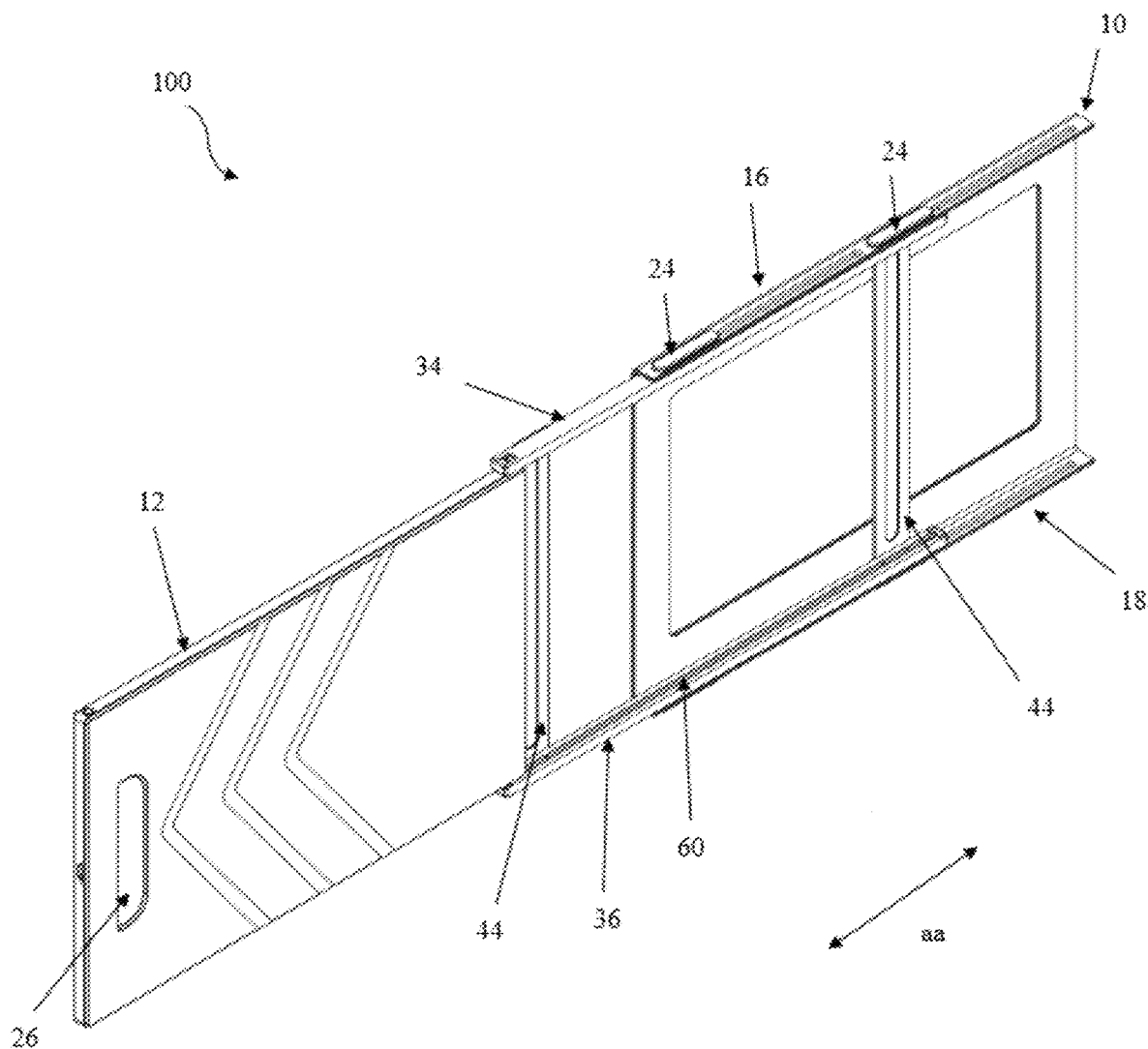
FIG. 5 is a front perspective view of the attachable display device in an extended position according to an embodiment of the present disclosure.

FIG. 5 is a front perspective view of the attachable display device 100 in an extended position. In this aspect, the display screen 12 is positionable in an extended position thereby allowing viewing of both the screen of the electronic device (not shown) and the display screen 12. As shown in FIG. 5, the display screen 12 is configured to slide out of the mounting frame 10 so that a user can utilize a second display screen when the attachable display device 100 is mounted onto the electronic device. The display screen 12 may be slidably deployable along the horizontal axis in either direction. In the illustrated embodiment, the display screen 12 is slidably deployed to the left along the aa-axis. However, the mounting frame 10 may be flipped or inverted so that the display screen 12 is slidably deployable to the right along the aa-axis.

The display screen 12 is slidably deployed in and out of the mounting frame 10 on sliding rails. As shown in FIG. 5, the display screen 12 is operatively connected to an upper slide rail 34 and a lower slide rail 36. More particularly, the upper slide rail 34 is operatively attached to a top surface of the display screen 12 and the lower slide rail 36 is operatively attached to a bottom surface of the display screen 12. The upper slide rail 34 and the lower slide rail 36 are operatively connected to the upper track 16 and the lower track 18, respectively, by the pucks 24. As discussed above, the pucks 24 limit the travel of the upper slide rail 34 and the lower slide rail 36 to prevent detachment of the display screen 12 from the mounting frame 10.

The upper slide rail 34 and the lower slide rail 36 each include a groove 60. The display screen 12 is operatively attached to the upper slide rail 34 and the lower slide rail 36 by a pivot joint (not shown) that travels along the grooves 60 as the display screen 12 is slidably deployed along the aa-axis. The upper slide rail 34 and the lower slide rail 36 are joined using one or more slats 44. The slats 44 ensure the distance between the upper slide rail 34 and the lower slide rail 36 is fixed and that the upper slide rail 34 and the lower slide rail 36 move in parallel alignment.

Figure 6:
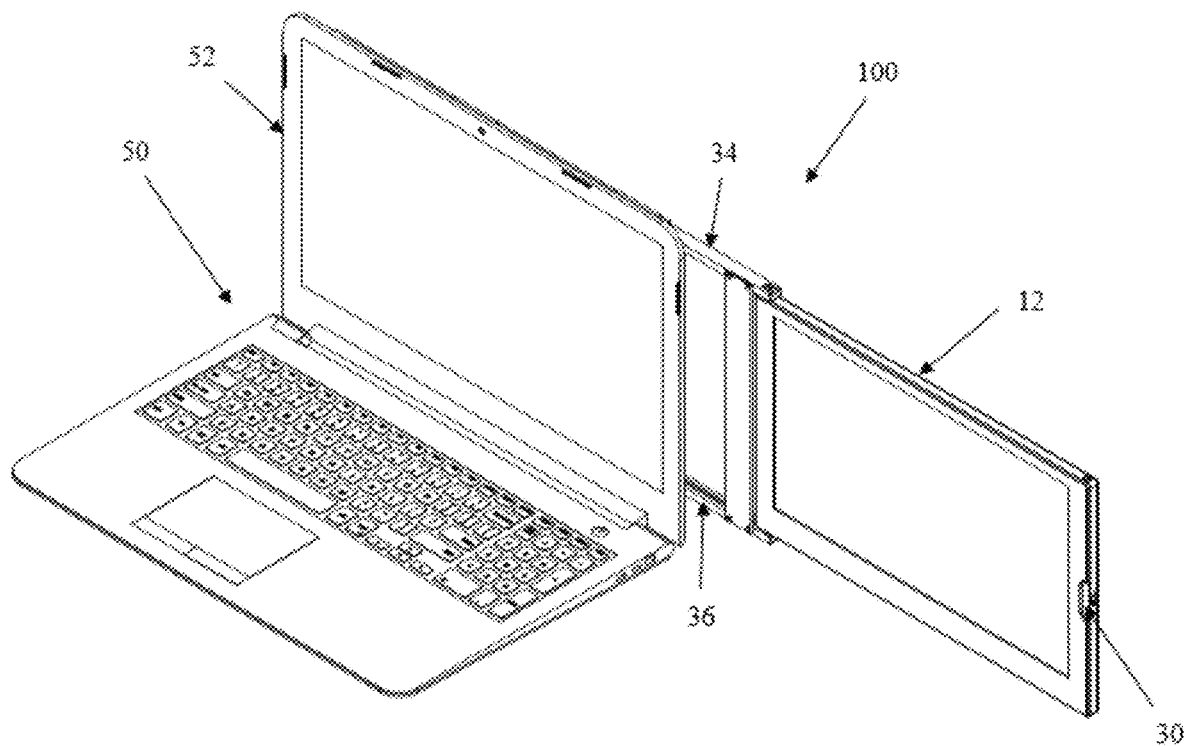
FIG. 6 is a front perspective view of an electronic device having the attachable display device mounted thereon in the extended position according to an embodiment of the present disclosure.

FIG. 6 is a front perspective view of an electronic device 50 having the attachable display device 100 mounted thereon in the extended position. In use, the user may grip the notch 30 and apply a force to slide the display screen 12 out from the mounting frame 10. The attachable display device 100 preferably utilizes a dual sliding mechanism that allows for the display screen 12 to slide out to different lengths relative to the screen 52 of the electronic device 50. As shown in FIG. 6, the upper slide rail 34 and the lower slide rail 36 are operable to slide along the mounting frame 10 to a first distance. In one embodiment, the upper slide rail 34 and the lower slide rail 36 are operable to slide along the mounting frame 10 to a first distance of about 110 mm or less. In another embodiment, the upper slide rail 34 and the lower slide rail 36 are operable to slide along the mounting frame 10 to a first distance of about 98 mm or less. In still another embodiment, the upper slide rail 34 and the lower slide rail 36 are operable to slide along the mounting frame 10 to a first distance of about 95 mm or less. In yet another embodiment, the upper slide rail 34 and the lower slide rail 36 are operable to slide along the mounting frame 10 to a first distance of about 90 mm or less. Once the upper slide rail 34 and the lower slide rail 36 reach the first distance, the display screen 12 is operable to slide along the upper slide rail 34 and the lower slide rail 36 (via the pivot joint) to a second maximum distance that is greater than the first distance. In one embodiment, the second maximum distance may be about 420 mm or less. In another embodiment, the second maximum distance may be about 415 mm or less. In still another embodiment, the second maximum distance may be about 410 mm or less. In yet another embodiment, the second maximum distance may be about 405 mm or less. This dual sliding mechanism allows for the attachable display device 100 to be used on different sized electronic devices, such as different sized laptops, without having to adjust the positioning of the mounting frame 10. For example, the attachable display device 100 can be used on different laptops ranging in size from 13 inches to 17 inches without having to adjust the positioning of the mounting frame 10.

Figure 7:
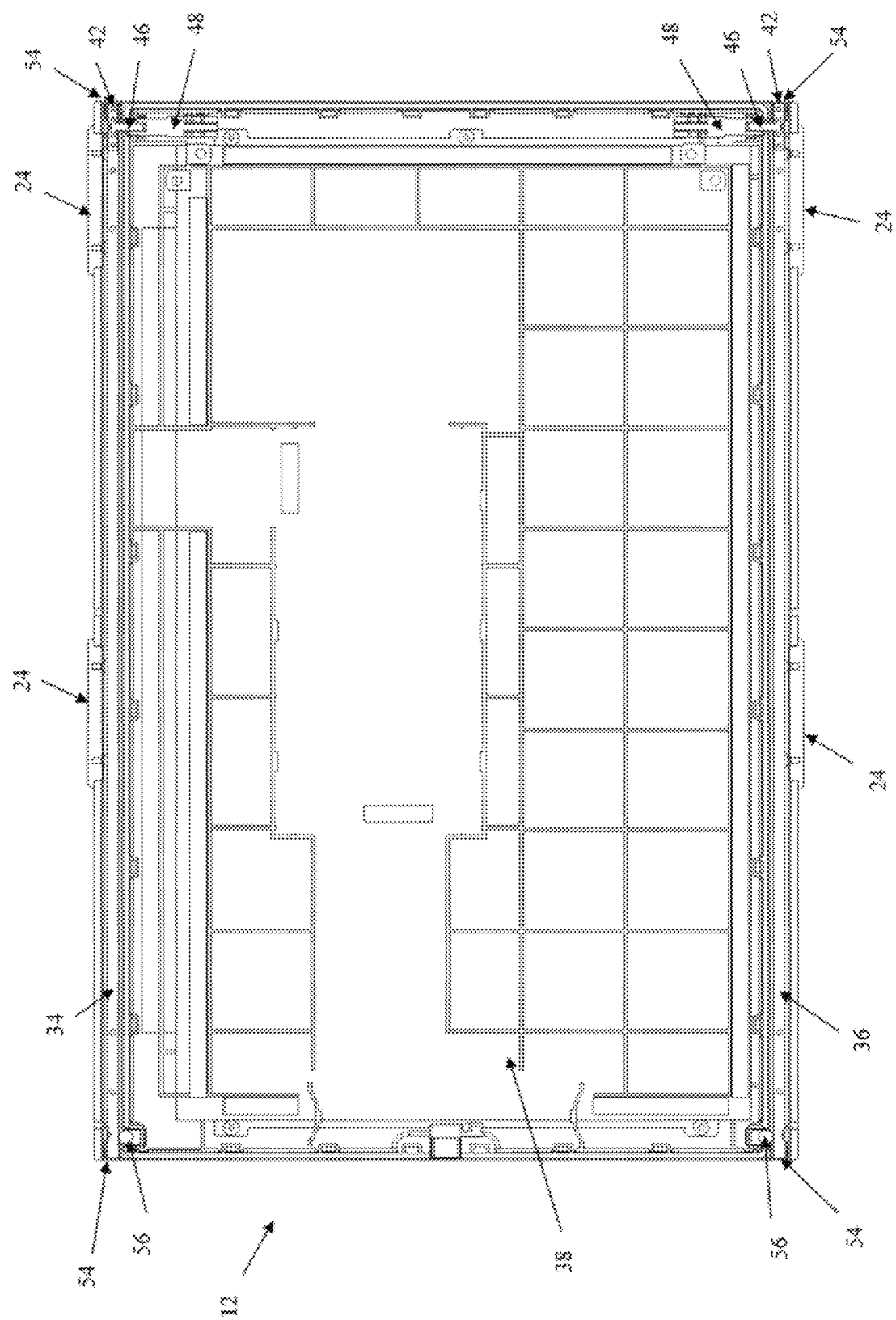
FIG. 7 is an interior view of the attachable display device according to an embodiment of the present disclosure.

FIG. 7 is an interior view of one embodiment of the attachable display device 100. The attachable display device 100 includes various internal components. In the illustrated embodiment, the display screen 12 is operatively connected to a control board 38 that provides power and a display signal to the display screen 12. The control board 38 may be any type of integrated circuit that is operable to transmit data from the electronic device 50 to the display screen 12. The attachable display device 100 may also include other internal components including, but not limited to, electrical components such as display driver circuitry, one or more batteries, sensors, microphones, speakers, integrated circuits, microprocessors, power management units, radio-frequency transceiver circuitry, baseband processor circuitry, discrete components such as capacitors, resistors, and inductors, switches, vibrators, connectors, printed circuit boards, wires, transmission lines, and other electrical devices. The internal components may be mounted on one or more substrates such as rigid printed circuit boards (e.g., boards formed from fiberglass-filled epoxy such as FR4 printed circuit boards on which patterned metal traces have been formed), flexible printed circuit boards (e.g., "flex circuits" formed form sheets of polymer such as polyimide on which patterned conductive traces have been formed), rigid flex (e.g., boards with both rigid portions and flex circuit tails), plastic carriers, or other substrates.

The display screen 12 is operatively connected to the upper slide rail 34 and the lower slide rail 36 by a pivot joint 42. The pivot joint 42 slides along each of the upper slide rail 34 and the lower slide rail 36 when the display screen 12 slides in and out of the mounting frame 10. The pivot joint 42 is operatively connected to the display screen 12 by a post 46 that is embedded within the display screen 12. The pivot joints 42 and the posts 46 are located on the side opposite to the side of the display screen 12 that will be slidably deployed from the mounting frame 10. For instance, if the display screen 12 will be slidably deployed to the left, the pivot joints 42 and the posts 46 should be located on the right side of the display screen 12 (as illustrated). This allows for each of the pivot joints 42 to slide along the upper slide rail 34 and the lower slide rail 36. As shown in FIG. 7, the display screen 12 includes a pivot joint 42 at a top right corner and a bottom right corner (i.e., the display screen 12 is operable to be slidably deployed to the left). Each pivot joint 42 is operatively attached to the display screen 12 by the post 46. While the pivot joints 42 are configured for sliding inside the upper slide rail 34 and the lower slide rail 36, the pivot joints 42 also allow for the display screen 12 to be pivotally connected to the upper slide rail 34 and the lower slide rail 36. Through the use of this pivot connection, the user can adjust the angle of the display screen 12.

The post 46 of each pivot joint 42 is operatively attached to a torque hinge 48. The torque hinge 48 is embedded within the display screen 12 and is positioned below the upper pivot joint 42 and above the lower pivot joint 42. The torque hinge 48 is designed to provide continual resistance throughout the entire range of motion in adjusting the display screen 12, making it possible to easily position the display screen 12 securely at a desired angle. Any suitable torque hinge or constant torque friction hinge may be used in accordance with the present disclosure.

The upper slide rail 34 and the lower slide rail 36 each comprise a stop member 54. The stop member 54 is located at each end of the upper slide rail 34 and the lower slide rail 36. The stop member 54 prevents detachment of the display screen 12 from the upper slide rail 34 and the lower slide rail 36 in case the pulling force applied to the display screen 12 by the user is excessive. In addition, the stop member 54 helps lock the display screen 12 in either the closed position (as shown in FIG. 1) or the extended position (as shown in FIG. 5). The stop member 54 may be any suitable stopping mechanism including, but not limited to, endcaps, plugs, pins, or spring detents. In one embodiment, the stop member 54 is a stamped spring steel endcap.

The upper slide rail 34 and the lower slide rail 36 also each comprise a ball detent 56. Each ball detent 56 is embedded within the display screen 12 and is located at a top and bottom corner on the side of the display screen 12 that will be slidably deployed from the mounting frame 10. The ball detents 56 hold the display screen 12 in position when the display screen 12 is in the closed position (as shown in FIG. 1) and allow for the display screen 12 to be deployed from the closed position with normal force. Ball detents, such as ball plungers, or any other suitable detent mechanisms may be used in accordance with the present disclosure. The use of ball detents 56 is merely illustrative.

Figure 8:
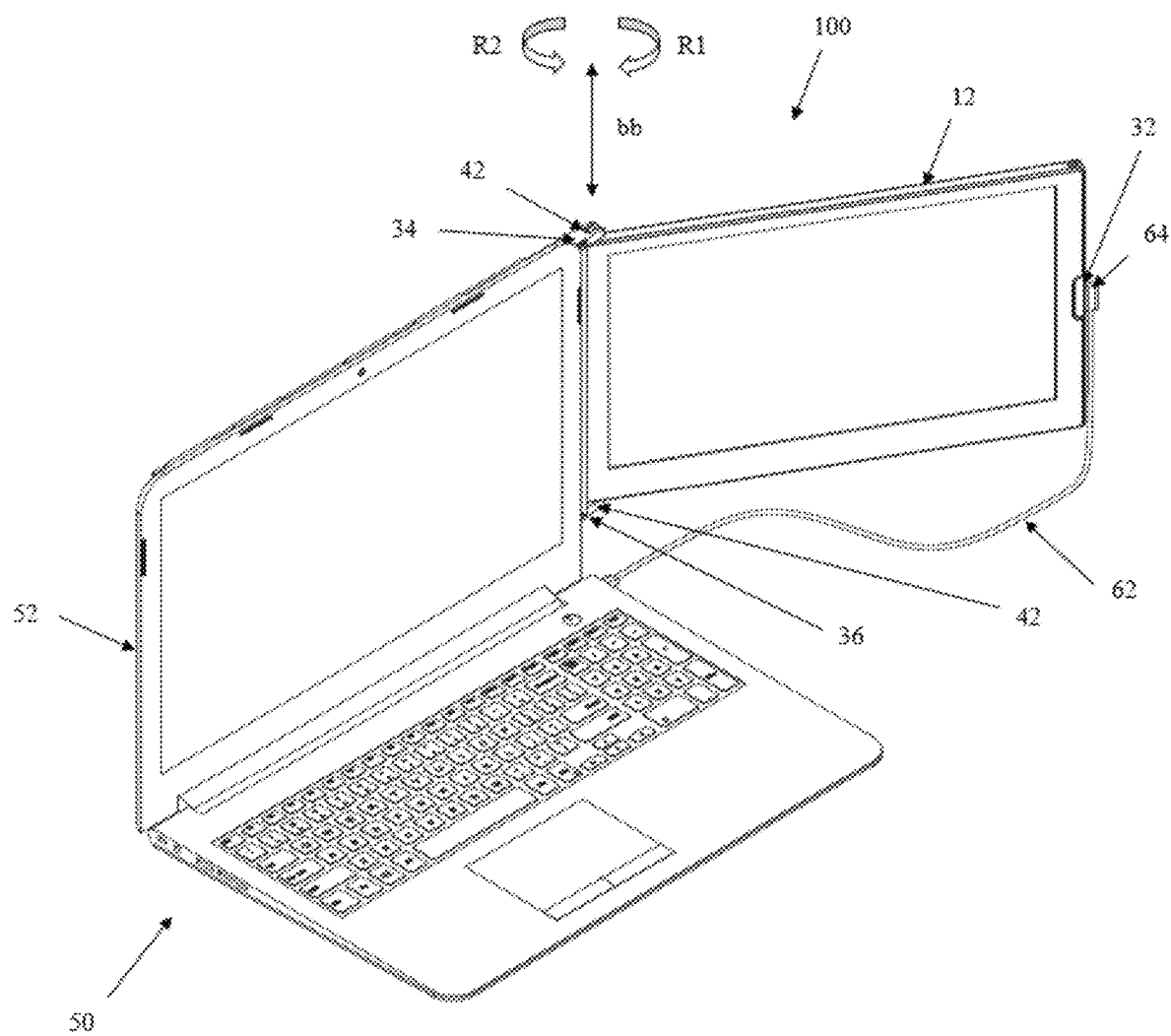
FIG. 8 is a front perspective view of the electronic device having the attachable display device mounted thereon in the extended position and where the display screen is angled.

FIG. 8 is a front perspective view of the electronic device 50 having the attachable display device 100 mounted thereon in the extended position and where the display screen 12 is in an angled position. As briefly discussed above, the pivot joints 42 allow for the display screen 12 to be pivotally connected to the upper slide rail 34 and the lower slide rail 36 along a vertical axis bb. In this aspect, the pivot joints 42 allow the display screen 12 to rotate relative to the electronic device 50 about rotation directions R1 and R2 which are opposite to each other. When rotated in direction R1, the display screen 12 may be angled toward the user as shown in FIG. 8. The display screen 12 can be rotated in direction R1 until the display screen 12 interferes with the screen 52 of the electronic device 50. When rotated in direction R2, the display screen 12 may be angled away from the user. In other words, the pivot joint 42 allows the display screen 12 to adjust from a plane-like display as shown in FIG. 6 to an angled display state as shown in FIG. 8 which allows the user to obtain a preferable view angle range and visual effect.

In the illustrated embodiment of FIG. 8, the display screen 12 is operatively connected to the electronic device 50 through a direct electrical connection using a USB cord 62 and a compatible plug 64 for engagement with the electrical connector 32, which is a USB connector. However, as discussed above, the display screen 12 may be operatively connected to the electronic device 50 by any suitable electrical connection.

Figure 9:
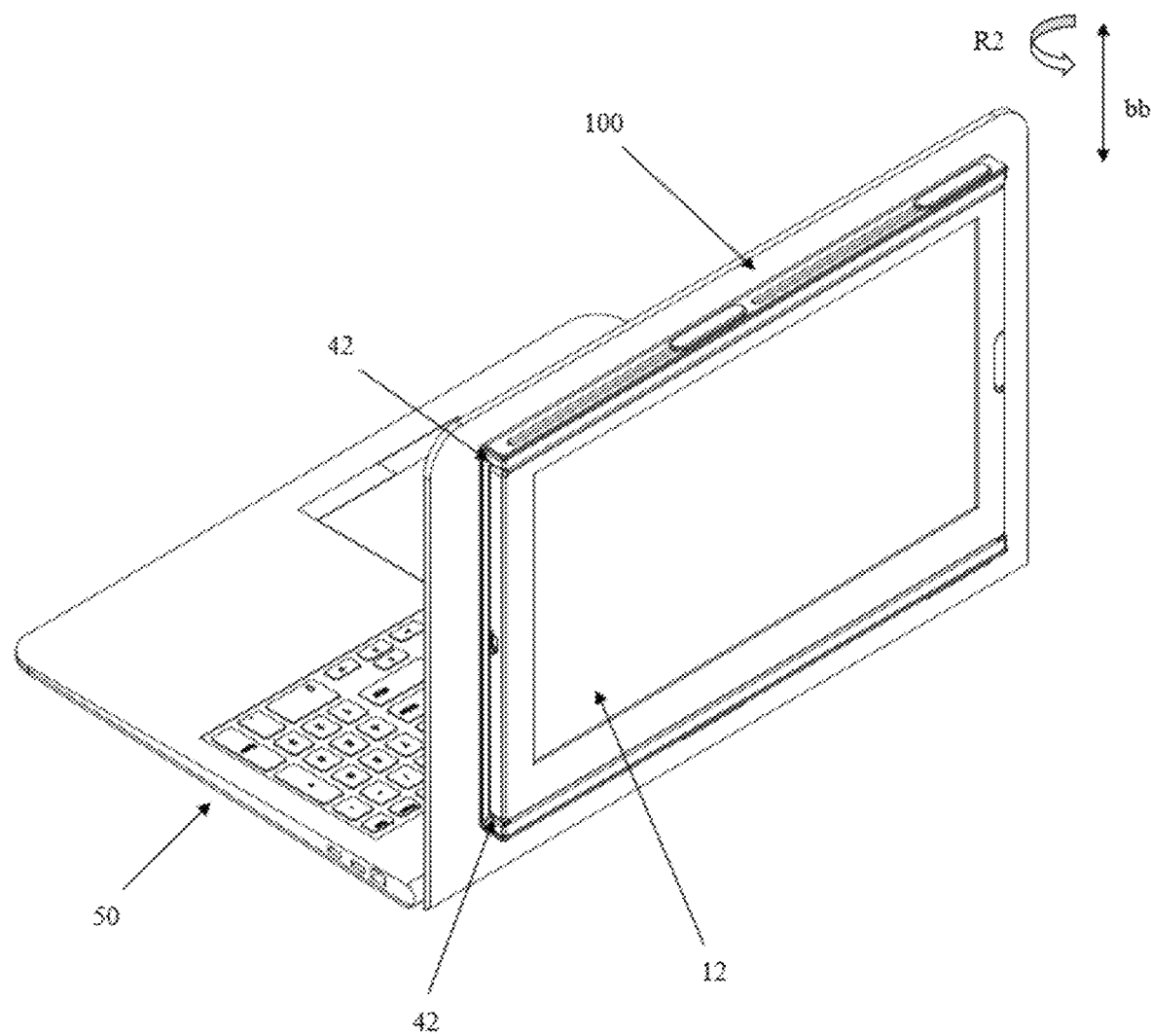
FIG. 9 is a rear perspective view of the electronic device having the attachable display device mounted thereon in a presentation position.

FIG. 9 is a rear perspective view of the electronic device 50 having the attachable display device 100 mounted thereon in a presentation position. As can be seen in FIG. 9, the pivot joints 42 allow for the display screen 12 to fully rotate in direction R2 along vertical axis bb to an angle of 180 degrees such that the display screen 12 can be viewed from the rear of the electronic device 50. This allows for the display screen 12 to be deployed in a presentation position for viewing by another user opposite the user positioned in front of the electronic device 50.

Figure 10:
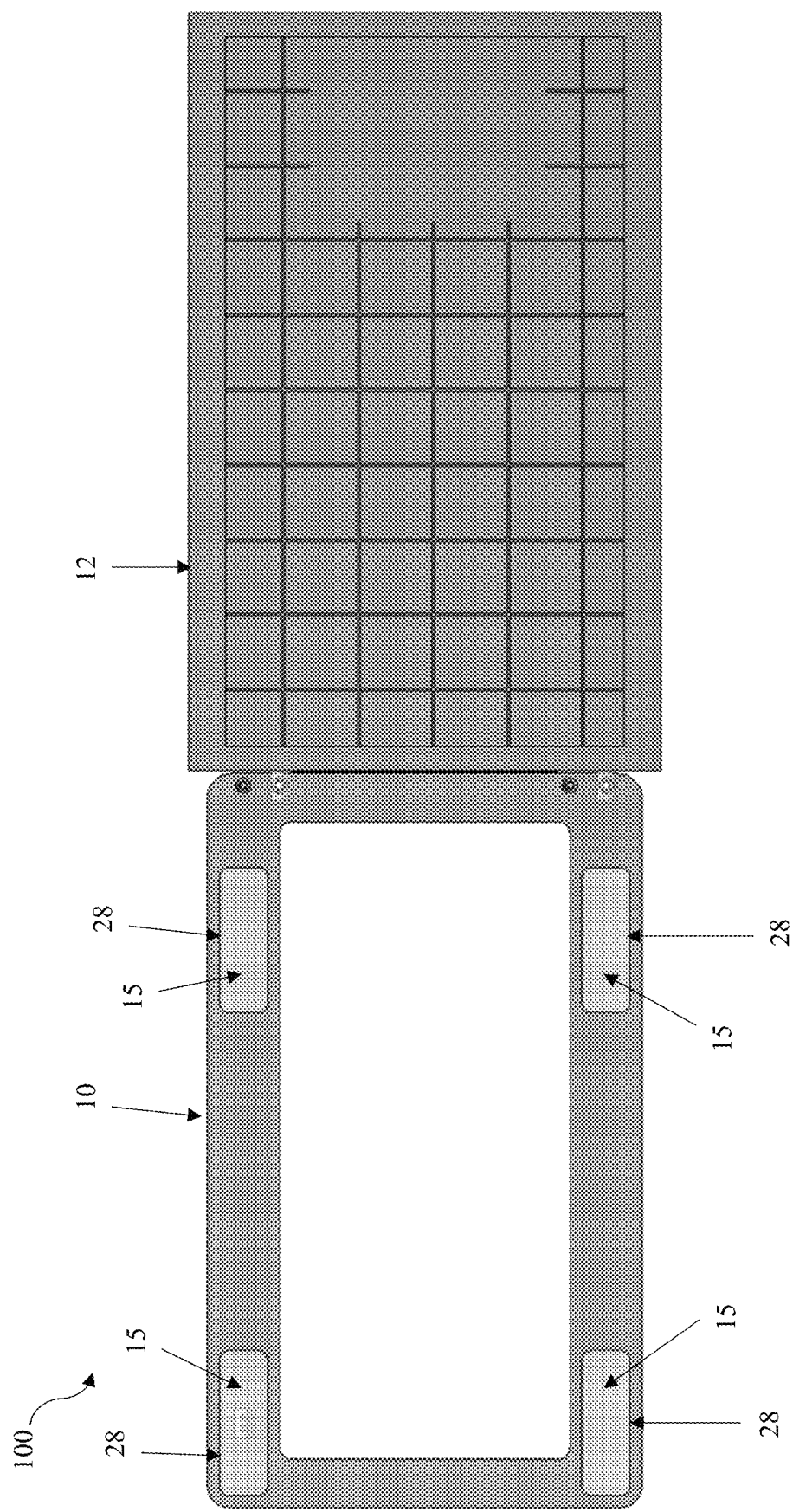
FIG. 10 is a rear perspective view of the attachable display device in an extended position according to an embodiment of the present disclosure.

FIG. 10 shows another embodiment of the attachable display device 100 contemplated by the present disclosure. FIG. 10 is a rear perspective view of the attachable display device 100 with the display screen 12 in an extended position according to this embodiment of the present disclosure. In this embodiment, the display screen 12 is positionable in an extended position thereby allowing viewing of both the screen of the electronic device (not shown) and the display screen 12. As shown in FIG. 10, the display screen 12 is operatively attached to the mounting frame 10. The display screen 12 is configurable to swing out from behind the mounting frame 10 so that a user can utilize a second display screen when the attachable display device 100 is mounted onto the electronic device. The display screen 12 is configured to swing from a closed position, as illustrated in FIG. 3, to an open or extended position, as illustrated in FIG. 10, via a hinge mechanism (not shown). The display screen 12 may be opened to the left or the right of the screen of the electronic device depending on the user's preference. In the illustrated embodiment, the display screen 12 is deployed to the right. However, the mounting frame 10 may be flipped or inverted so that the display screen 12 is deployed to the left.

Figure 11:
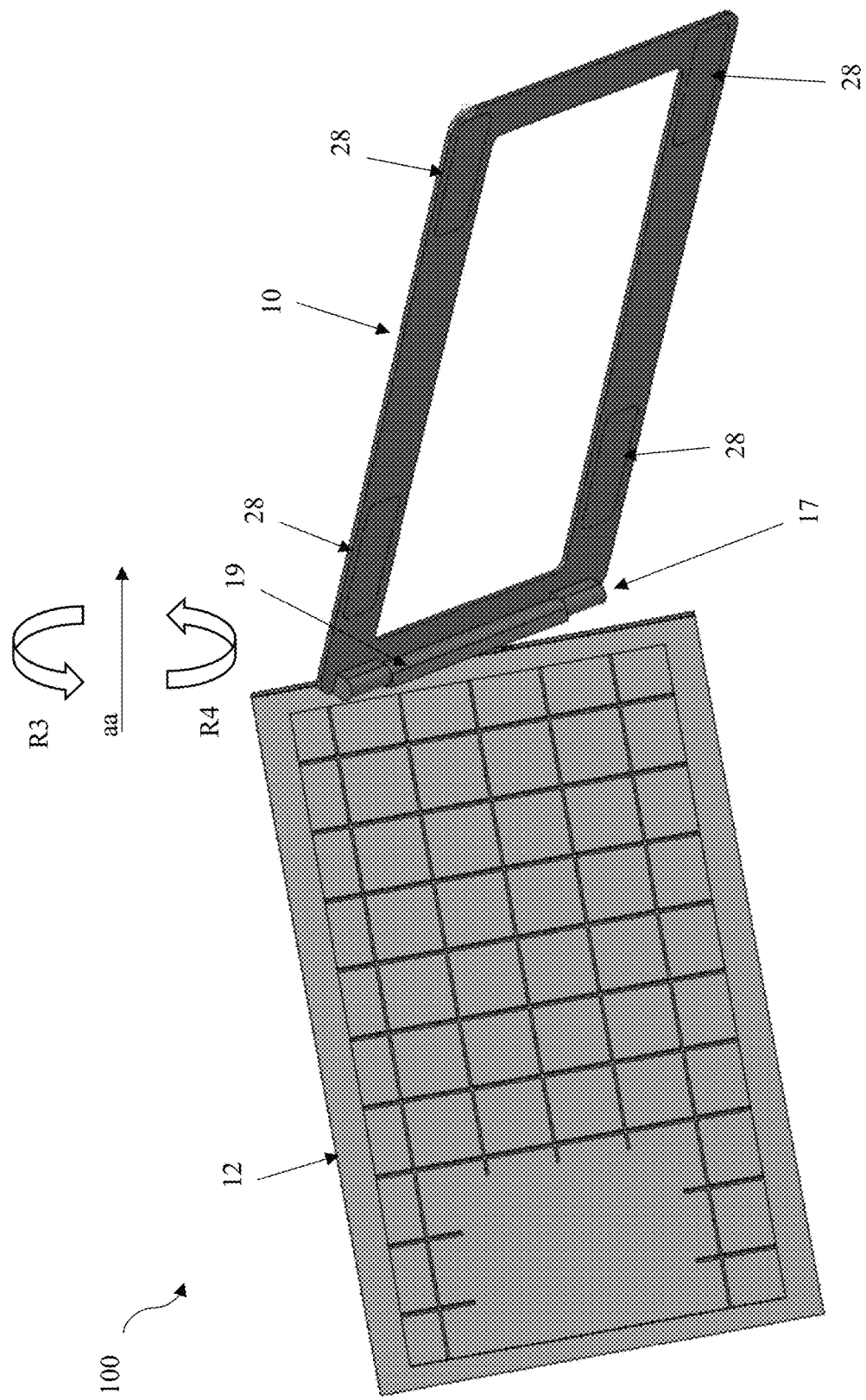
FIG. 11 is a rear perspective view of the attachable display device in an extended and tilted position according to one embodiment of the present disclosure.

FIG. 11 is a rear perspective view of the attachable display device 100 with the display screen 12 in an extended and tilted position according to another embodiment of the present disclosure. FIG. 11 illustrates the hinge mechanism by which the display screen 12 is adjustable about the mounting frame 10. In one embodiment, the hinge mechanism includes a torque hinge 17. The torque hinge 17 operatively connects the display screen 12 to the mounting frame 10 and allows for complete adjustability of the display screen 12 during use. The torque hinge 17 is designed to provide continual resistance throughout the entire range of motion in adjusting the display screen 12, making it possible to not only deploy the display screen 12 between the closed and open/extended positions through the use of a swinging mechanism, but also securely tilt the display screen 12 to any desired angle (as shown in FIG. 11).

In this aspect, the torque hinge 17 allows the display screen 12 to fully rotate about horizontal axis aa. The user can adjust the display screen 12 by tilting the display screen 12 upward or downward. When rotated in direction R3, the display screen 12 may be tilted downward. When rotated in direction R4, the display screen 12 can be titled upward. The display screen 12 can be rotated in direction R3 or direction R4 in a complete circle (i.e., 360 degrees). In this regard, the display screen 12 can be stored in the closed position with the face of the display screen 12 adjacent to the mounting frame 10 (as shown in FIG. 3) and, when opened, the display screen 12 can be flipped or rotated 180 degrees so that the face of the display screen 12 can be viewed by the user.

In another embodiment, the user may desire to rotate the display screen 12 to an angle of 180 degrees and swing the display screen 12 to the closed position such that the display screen 12 can be viewed from the rear of the electronic device. This allows for the display screen 12 to be deployed in a presentation position for viewing by another user opposite the user positioned in front of the electronic device.

In the illustrated embodiment, the torque hinge 17 includes an elongated structure 19 that is attached to the mounting frame 10 and vertically extends from the top of the mounting frame 10 to the bottom of the mounting frame 10. In one embodiment, the torque hinge 17 is about 1 inch to about 5 inches in length. In another embodiment, the torque hinge 17 is about 2 inches to about 4 inches in length. In still another embodiment, the torque hinge 17 is about 3 inches to about 4 inches in length. This length helps with rigidity and stability; however, the torque hinge 17 may be shorter if needed. The torque hinge 17 may be attached to the mounting frame 10 by any suitable means including, but not limited to, hooks, adhesives, screws, pins, projections, or snap catch elements.

Figure 12:
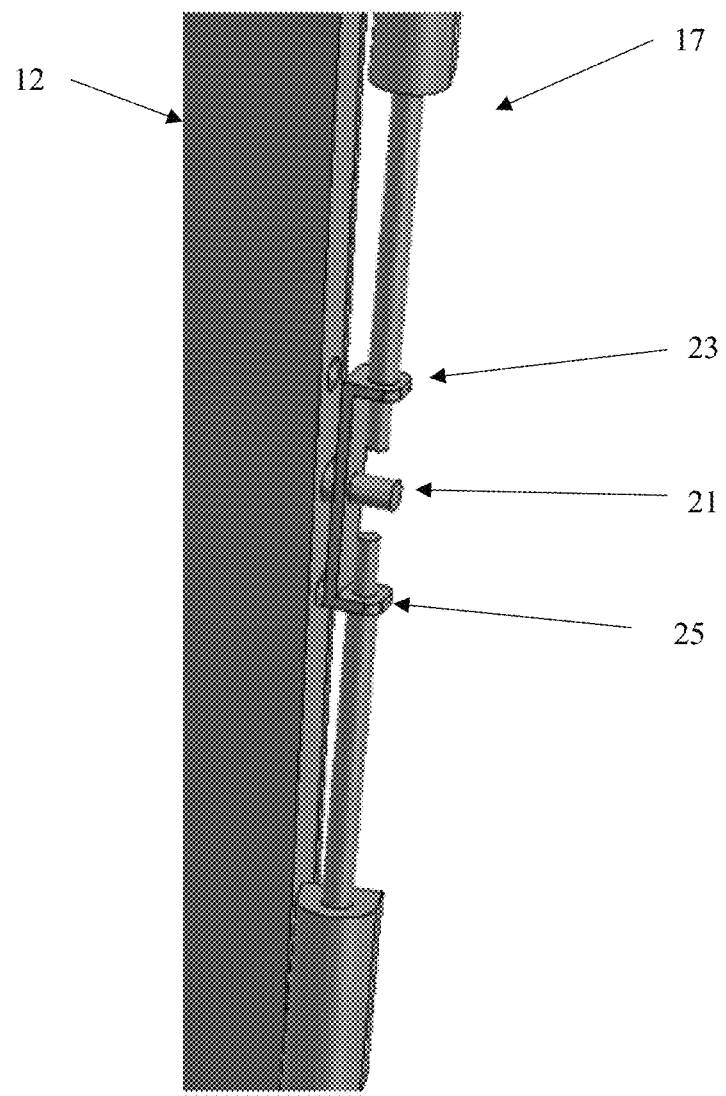
FIG. 12 is an interior view of a torque hinge according to one embodiment of the present disclosure.

FIG. 12 is an interior view of the torque hinge 17 according to one embodiment of the present disclosure. As shown in FIG. 12, the torque hinge 17 is operatively connected to the display screen 12 at a central pivot point 21. The central pivot point 21 allows for complete vertical adjustability of the display screen 12 about the mounting frame 10. That is, the central pivot point 21 allows for the display screen 12 to tilt upward and downward relative to the screen of the electronic device upon which the attachable display device 100 is mounted. The central pivot point 21 also allows the user to adjust the horizontal viewing angle of the display screen 12.

In one embodiment, the torque hinge 17 provides two additional pivot points. As shown in FIG. 12, upper pivot point 23 is located above central pivot point 21 and lower pivot point 25 is located below the central pivot point 21.

Upper pivot point 23 and lower pivot point 25 allow for the display screen 12 to swing or fold from the closed position to the open position.

While the torque hinge 17 has been described herein as illustrated in FIGS. 11 and 12, any suitable torque hinge or constant torque friction hinge may be used in accordance with the present disclosure. In addition, any number of torque hinges 17 may be utilized with the attachable display device 100 to provide adjustability. For instance, the attachable display device 100 may include two or more separate torque hinges 17. In another embodiment, the attachable display device 100 may include three or more separate torque hinges 17.

Figure 13:
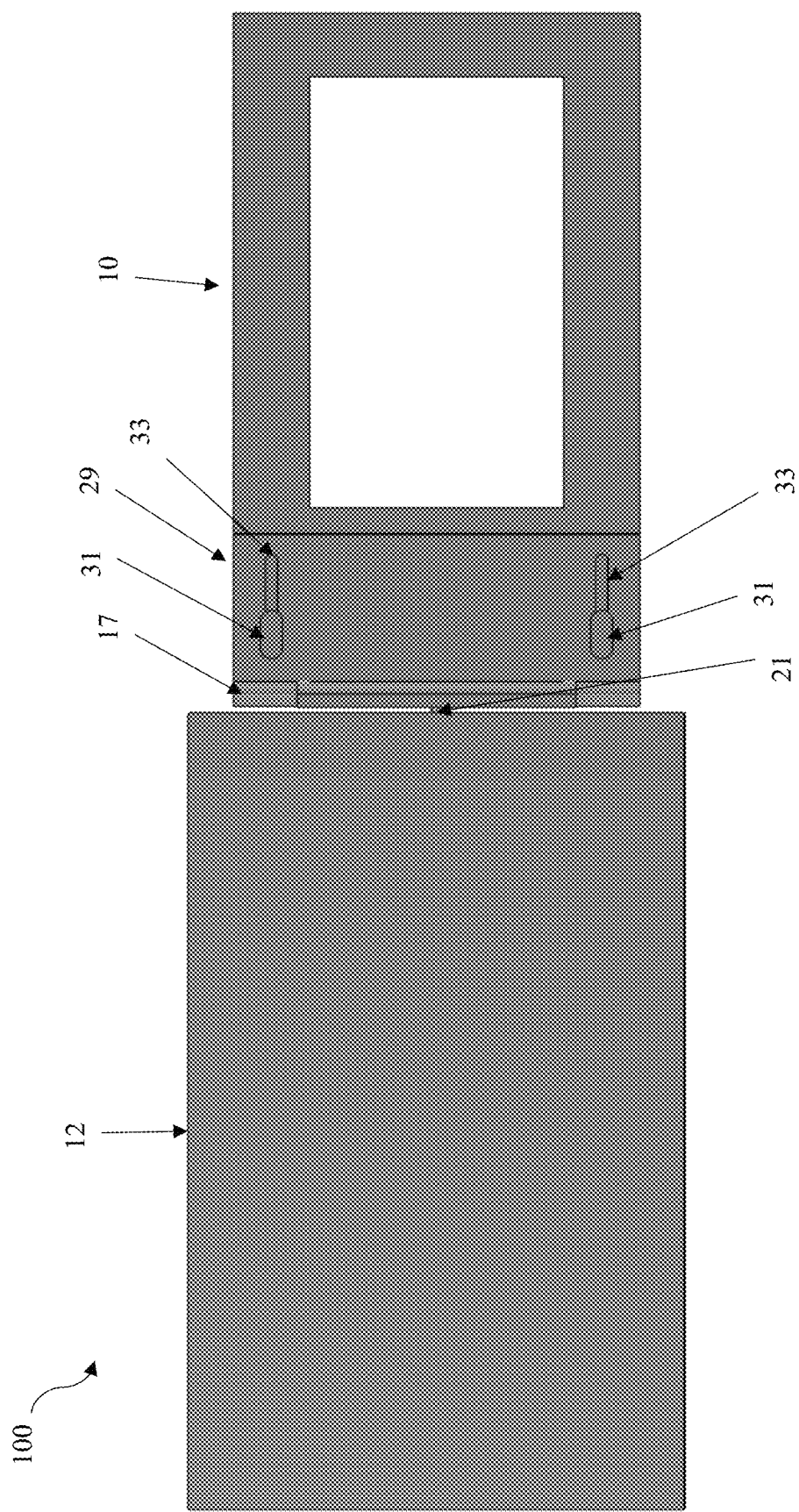
FIG. 13 is a front perspective view of the attachable display device in an extended position according to another embodiment of the present disclosure.

FIG. 13 is a front perspective view of the attachable display device 100 in an extended position according to one embodiment of the present disclosure. As shown in FIG. 13, the display screen 12 may be configured to slidably deploy from the mounting frame 10. In this aspect, the mounting frame 10 is operatively connected to a movable panel 29. The display screen 12 is operatively attached to the movable panel 29 at the central pivot point 21 of the torque hinge 17. The movable panel 29 includes a plurality of glides 31 that assist in slidably deploying the display screen 12. The glides 31 travel along a set of grooves 33 located on both the movable panel 29 and the mounting frame 10. In operation, as the glides 31 travel along the set of grooves 33 to the right, the movable panel 29 slides outwardly from the mounting frame 10, which allows for the display screen 12 to also extend outwardly. The display screen 12 may extend outwardly about 4 inches. In another embodiment, the display screen 12 may extend outwardly about 3 inches. In still another embodiment, the display screen 12 may extend outwardly about 2 inches. The glides 31 may be operated manually. That is, the user may be able to use normal force to slide the display screen 12 in and out of the mounting frame 10. In another embodiment, the glides 31 may be operated by any electronic means that can be incorporated into the attachable display device 100.

In the illustrated embodiment, there are two glides 31—one located near the top of the movable panel 29 and the other located near the bottom of the movable panel 29. However, the number and arrangement of the glides 31 on the movable panel 29 may vary so long as the display screen 12 can be slidably deployed from the mounting frame 10.

Figure 14:
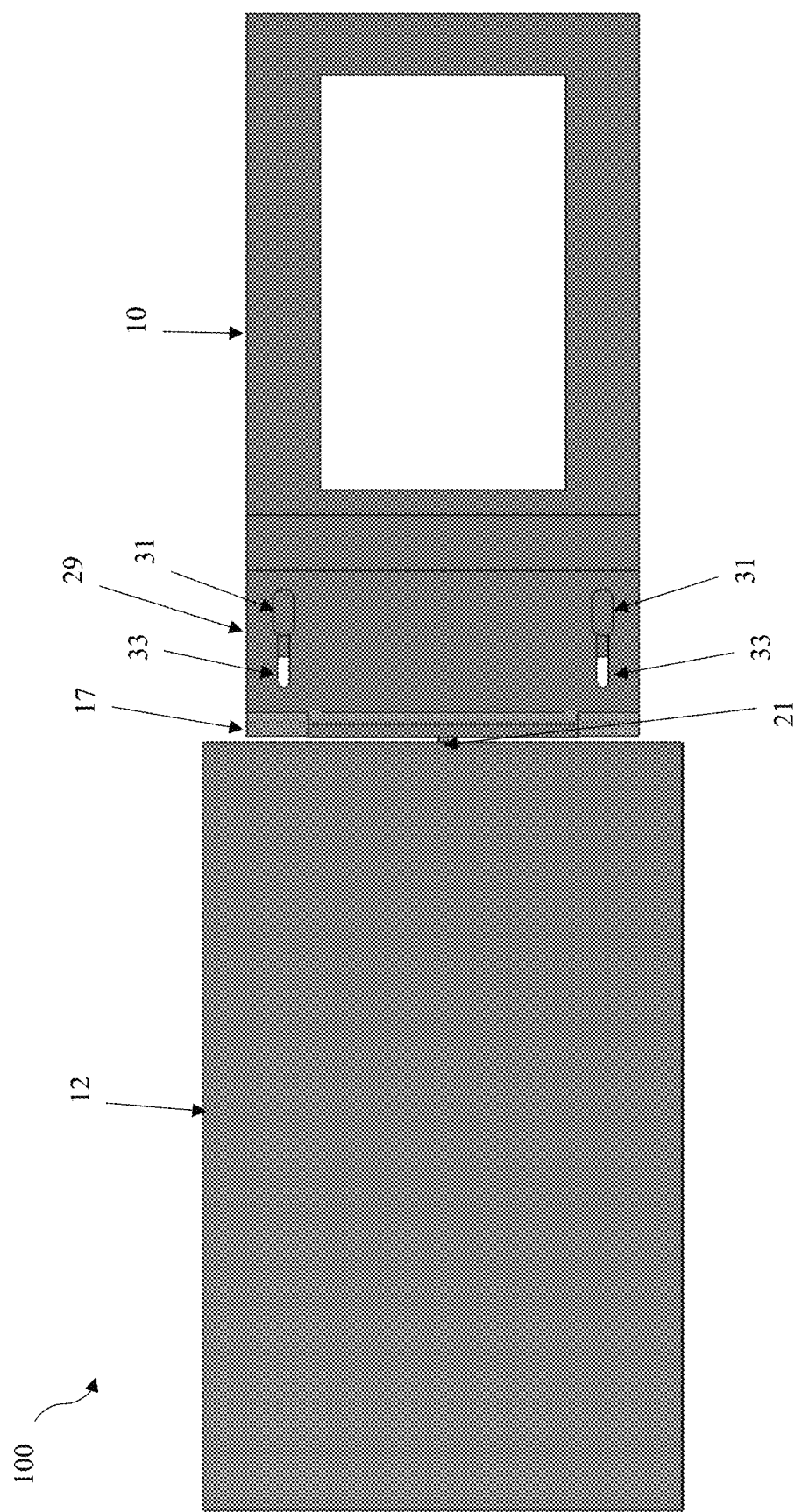
FIG. 14 is a front perspective view of the attachable display device in an extended position where the display screen is slidably deployed according to one embodiment of the present disclosure.

FIG. 14 is a front perspective view of the attachable display device 100 in an extended position according to yet another embodiment of the present disclosure. FIG. 14 shows the display screen 12 slidably deployed from the mounting frame 10. As can be seen in FIG. 14, the movable panel 29 is completely extended from the mounting frame 10 via the glides 31. When the display screen 12 is slidably deployed from the mounting frame 10, the display screen 12 maintains the full functionality of the torque hinge 17 such that the display screen 12 can be fully rotated about the horizontal axis and titled about the vertical axis.

Figure 15A:
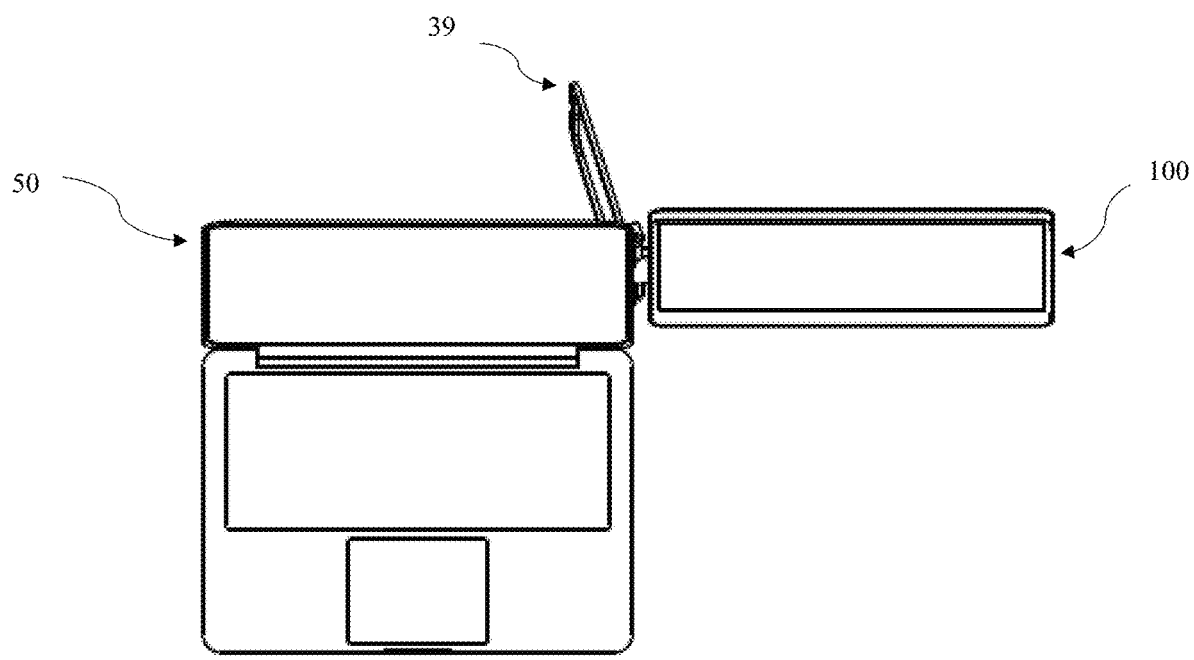
FIG. 15A is a top view of the attachable display device in an extended position and attached to a portable electronic device according to one embodiment of the present disclosure.
Figure 15B:
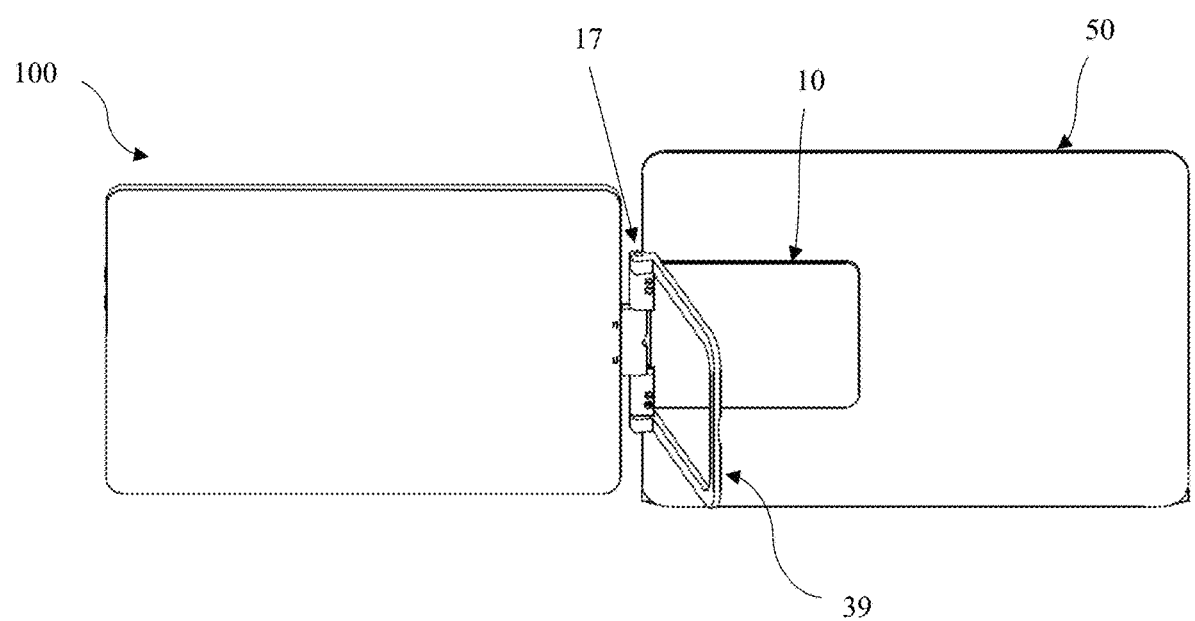
FIG. 15B is a back view of the attachable display device in an extended position and attached to a portable electronic device according to one embodiment of the present disclosure.
Figure 15C:
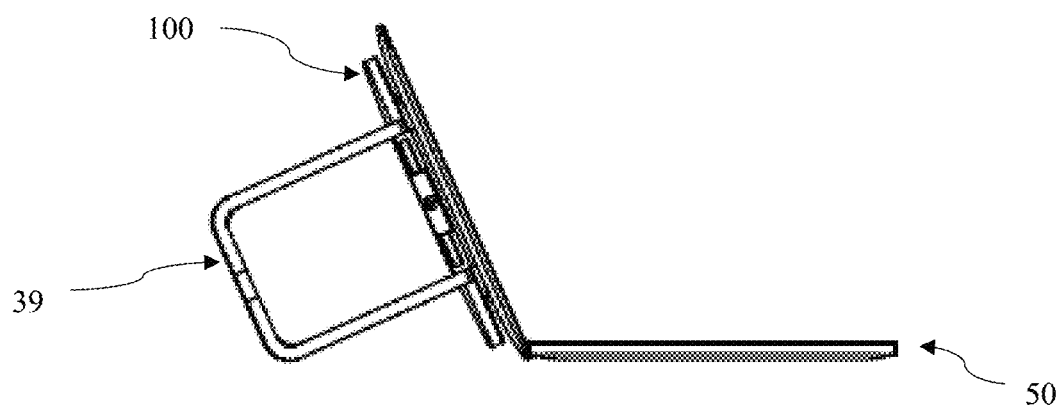
FIG. 15C is a side view of the attachable display device in an extended position and attached to a portable electronic device according to one embodiment of the present disclosure.

FIGS. 15A, 15B, and 15C illustrate a top view, a back view, and a side view, respectively, of the attachable display device 100 in an extended position and attached to a portable electronic device 50. As can be seen in FIGS. 15A, 15B, and 15C, the attachable display device 100 may include a kickstand 39 to provide support when the attachable display device 100 is in an extended position. In some embodiments, as shown in FIG. 15B, the kickstand 39 is rotatably attached to the mounting frame 10. The kickstand 39 can be rotated to various positions to support the attachable display device 100, as shown in FIGS. 15A, 15B, and 15C.

Figure 16:
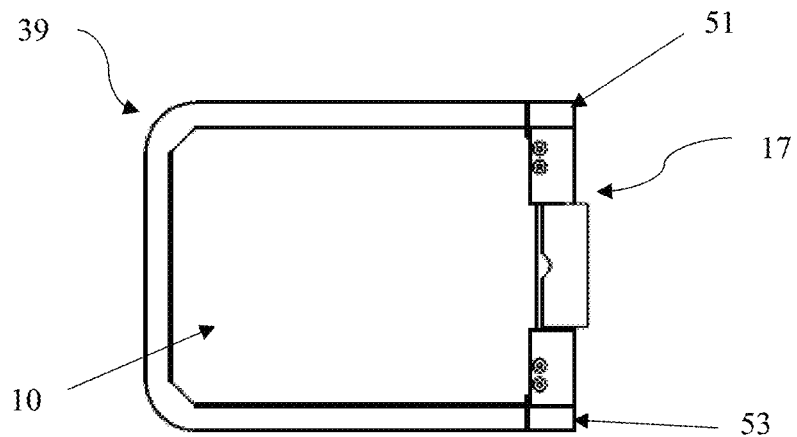
FIG. 16 is a front perspective view of a kickstand in a closed position according to one embodiment of the present disclosure.

FIG. 16 illustrates a perspective view of the kickstand 39 in a closed position. As shown in FIG. 16, the kickstand 39 has a cut-out U-shape so that the kickstand 39 may be integral with and forms a portion of the mounting frame 10 when in the closed position. In this aspect, the kickstand 39 can be stored within the mounting frame 10 when the mounting frame 10 is positioned on a surface of the portable electronic device 50. In one embodiment, the size and shape of the kickstand 39 conforms to the size and shape of the mounting frame 10 such that the kickstand 39 does not protrude from the plane formed by the mounting frame 10 when in the closed position. For instance, as shown in FIG. 16, the shape and size of the kickstand 39 conforms to the contour of the mounting frame 10 such that the kickstand 39 is integral with the mounting frame 10.

In some embodiments, the cut-out shape, as shown in FIG. 16, improves the portability and compactness of the kickstand 39. For instance, due to the cut-out shape, the kickstand 39 may be about 60 percent of the weight of the mounting frame 10. In another embodiment, the kickstand 39 may be about 50 percent of the weight of the mounting frame 10. In still another embodiment, the kickstand 39 may be about 40 percent of the weight of the mounting frame 10. In yet another embodiment, the kickstand 39 may be about 30 percent of the weight of the mounting frame 10.

In other embodiments, the shape of the kickstand 39 allows for the kickstand 39 to be about 5 percent or less of the total weight of the attachable display device 100. In another embodiment, the shape of the kickstand 39 allows for the kickstand 39 to be about 3 percent or less of the total weight of the attachable display device 100. In still another embodiment, the shape of the kickstand 39 allows for the kickstand 39 to be about 1 percent or less of the total weight of the attachable display device 100.

Figure 17:
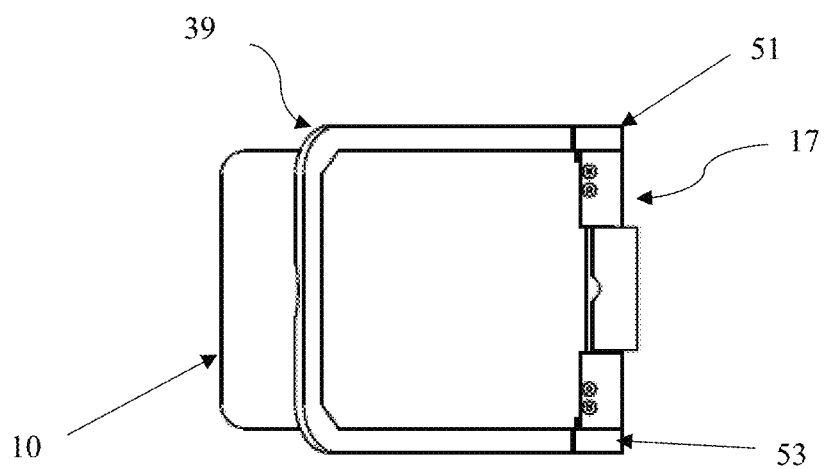
FIG. 17 is a front perspective view of a kickstand in an open position according to one embodiment of the present disclosure.

FIG. 17 illustrates a perspective view of the kickstand 39 in an open position. As shown in FIG. 17, the kickstand 39 can be rotated away from the mounting frame 10 such that the kickstand 39 can rest on the surface on which the portable electronic device 50 is placed. The kickstand 39 can be rotatably attached to the mounting frame 10. In some embodiments, the kickstand 39 can rotate to various positions to provide support for the attachable display device 100. For instance, when the kickstand 39 is rotated away from the mounting frame 10, the kickstand 39 can rotate to an angle of about 50 degrees to about 130 degrees while supporting the attachable display device 100. In another embodiment, the kickstand 39 can rotate to an angle of about 60 degrees to about 120 degrees while supporting the attachable display device 100. In still another embodiment, the kickstand 39 can rotate to an angle of about 70 degrees to about 110 degrees while supporting the attachable display device 100. In yet another embodiment, the kickstand 39 can be rotated to an angle of about 90 degrees to provide optimal support. When in the open position, the kickstand 39 can sufficiently support the weight of the attachable display device 100.

In one embodiment, the kickstand 39 is operatively attached to the mounting frame 10 via the torque hinge 17. The torque hinge 17 allows for the kickstand 39 to rotate away from the mounting frame 10 and provides constant resistance throughout the entire range of rotation, enabling a user to position the kickstand 39 at any desired angle. As shown in FIGS. 16 and 17, the kickstand 39 is operatively attached to the torque hinge 17 at an upper connection point 51 and a lower connection point 53. This configuration allows for the kickstand 39 to open and close freely without interfering with the central pivot point 21 (where the display screen 12 is connected to the mounting frame 10). In one embodiment, the kickstand 39 may be removably attached to the torque hinge 17 at connection points 51 and 53 by any suitable attachment means so long as the kickstand 39 can rotate about the torque hinge 17. For example, the kickstand 39 may be attached to the torque hinge 17 via screws, pins, or projections.

In another embodiment, the kickstand 39 may be releasably attached to the mounting frame 10. In this embodiment, the kickstand 39 may be opened from the mounting frame 10 via spring activation. In still another embodiment, the kickstand 39 may be releasably attached to the mounting frame 10 via a magnetic force. In this aspect, a magnet (not shown) may be positioned on a side of the mounting frame 10 opposite the torque hinge 17. The magnet can provide a secure connection between the kickstand 39 and the mounting frame 10 when not in use but is still able to be opened with sufficient force. In yet another embodiment, the kickstand 39 may be releasably attached to the mounting frame 10 by a ratcheting mechanism. In this embodiment, the ratcheting mechanism can lock the kickstand 39 in place on the mounting frame 10 until the kickstand 39 is opened.

Figure 18A:
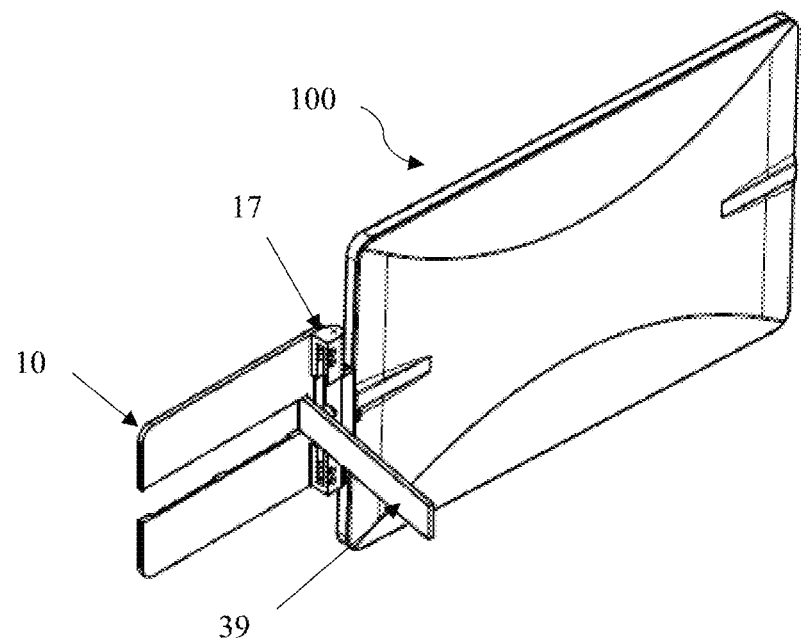
FIG. 18A is a front perspective view of a kickstand in an open position according to another embodiment of the present disclosure.
Figure 18B:
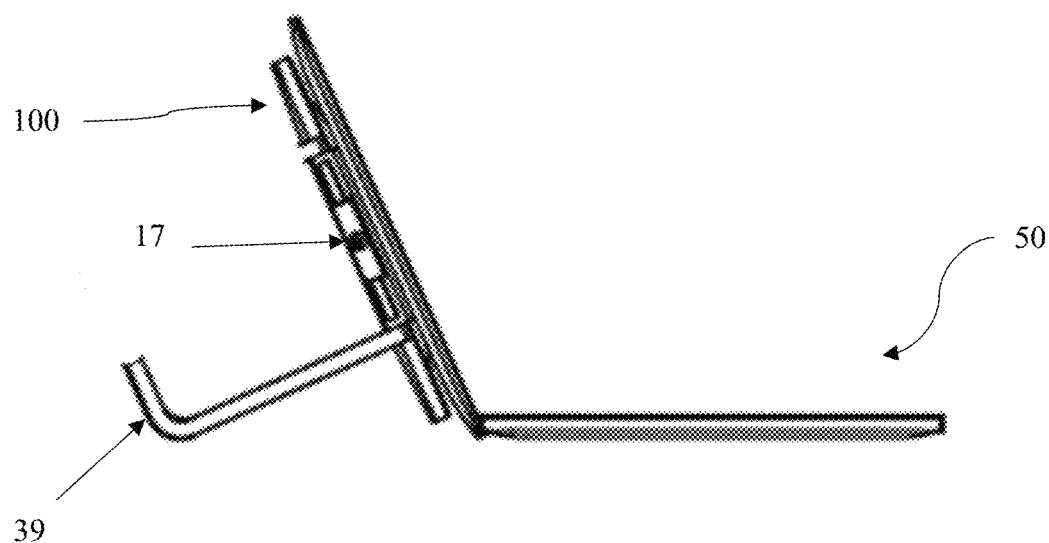
FIG. 18B is a side view of a kickstand in an open position according to yet another embodiment of the present disclosure.

While the kickstand 39 has been illustrated herein as a cut-out U-shape, one of ordinary skill in the art will recognize that the kickstand 39 may be formed into a variety of shapes and sizes. FIGS. 18A and 18B show examples of different designs of the kickstand 39. As shown in FIG. 18A, the kickstand 39 may be in the shape of a rectangular panel that is stored within the mounting frame 10 such that the rectangular panel is integral with the mounting frame 10. In this embodiment, the kickstand 39 can open and close out of the mounting frame 10. In another embodiment, as shown in FIG. 18B, the kickstand 39 may include a single arm support (rather than a U-shape).

The various components of the attachable display device 100 described herein may be constructed or manufactured from materials, such as various polymers, plastics, stainless steel, aluminum, and combinations thereof. Similarly, the various parts described herein may be constructed according to various manufacturing methods including injection molding, milling, forging, extrusion, pressing, 3D printing, and other related manufacturing methods.

The device described and claimed herein is not to be limited in scope by the specific embodiments herein disclosed, since these embodiments are intended as illustrations of several aspects of the disclosure. Any equivalent embodiments are intended to be within the scope of this disclosure. Indeed, various modifications of the device in addition to those shown and described herein will become apparent to those skilled in the art from the foregoing description. Such modifications are also intended to fall within the scope of the appended claims. All patents and patent applications cited in the foregoing text are expressly incorporated herein by reference in their entirety.

What is claimed is:

1. An attachable display device, comprising:
a mounting frame configured to be removably attached to a rear of a portable electronic device, and
a torque hinge operatively attached to the mounting frame, wherein the torque hinge comprises a central pivot point,
a display screen operatively connected to the mounting frame via the torque hinge,
wherein the display screen is operable to selectively transition between a closed position in which the display screen is positioned behind the mounting frame and an open position in which the display screen extends outwardly of the mounting frame to be exposed from one side of the mounting frame, and
wherein the display screen is configured to vertically rotate relative to the mounting frame to allow the display screen to be placed in a tilted configuration and the display screen is configured to horizontally rotate relative to the mounting frame to allow the display screen to be placed in an angled configuration.

2. The attachable display device of claim 1, wherein the display screen is pivotally coupled to the central pivot point of the torque hinge.

3. The attachable display device of claim 2, wherein the display screen is configured to vertically rotate 360 degrees about the central pivot point.

4. The attachable display device of claim 1, further comprising a kickstand operably attached to the mounting frame and configured to rotate to an open position.

5. The attachable display device of claim 4, wherein the kickstand is operably attached to the mounting frame via the torque hinge.

6. The attachable display device of claim 4, wherein the kickstand is integral with the mounting frame when the kickstand is in a closed position.

7. An attachable display device, comprising:
a mounting frame configured to be removably attached to a rear of a portable electronic device,
a torque hinge operatively attached to the mounting frame, wherein the torque hinge comprises a central pivot point,
a display screen pivotally coupled to the mounting frame via the central pivot point of the torque hinge,
wherein the display screen is operable to swing between a closed position in which the display screen is positioned behind the mounting frame and an open position in which the display screen extends outwardly of the mounting frame to be exposed from one side of the mounting frame, and
wherein, in the open position, the display screen is configured to vertically rotate relative to the mounting frame to allow the display screen to be placed in a tilted configuration and the display screen is configured to horizontally rotate relative to the mounting frame to allow the display screen to be placed in an angled configuration.

8. The attachable display device of claim 7, wherein the mounting frame comprises a magnet attached thereto.

9. The attachable display device of claim 8, wherein the mounting frame comprises a recess having the magnet embedded therein and the magnet is configured to slide in a horizontal direction within the recess when the display screen transitions between the closed position and the open position.

10. The attachable display device of claim 7, wherein the display screen is configured to vertically rotate 360 degrees about the central pivot point.

11. The attachable display device of claim 7, further comprising a kickstand operably attached to the mounting frame and configured to rotate to an open position.

12. The attachable display device of claim 11, wherein the kickstand has a cut-out U-shape.

13. The attachable display device of claim 12, wherein the kickstand conforms to a contour of the mounting frame such that the kickstand is integral with the mounting frame when in a closed position.

14. The attachable display device of claim 11, wherein the kickstand is rotatable to an angle ranging from about 50 degrees to about 130 degrees.

\* \* \* \* \*